US011868728B1

(12) United States Patent
Meissner et al.

(10) Patent No.: US 11,868,728 B1
(45) Date of Patent: Jan. 9, 2024

(54) MULTI-DOMAIN SKILLS

(71) Applicant: Amazon Technologies, Inc., Seattle, WA (US)

(72) Inventors: Jeffery Alan Meissner, Issaquah, WA (US); Ernesto Gonzalez, Bellevue, WA (US); Nikhil Mehta, Bothell, WA (US); Anemona Oana Hagea, Seattle, WA (US); John Montague Howard, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/217,759

(22) Filed: Dec. 12, 2018

Related U.S. Application Data

(60) Provisional application No. 62/733,418, filed on Sep. 19, 2018.

(51) Int. Cl.
*G06F 40/30* (2020.01)
*G06F 3/0484* (2022.01)

(52) U.S. Cl.
CPC ............ *G06F 40/30* (2020.01); *G06F 3/0484* (2013.01)

(58) Field of Classification Search
CPC . G10L 15/265; G10L 2015/088; G10L 15/08; G10L 15/193; G10L 15/32; G10L 17/24; H04L 67/306
See application file for complete search history.

(56) References Cited

U.S. PATENT DOCUMENTS

| 9,070,366 B1* | 6/2015 | Mathias ................. G10L 15/26 |
| 9,190,055 B1* | 11/2015 | Kiss ....................... G06F 40/295 |
| 2016/0188565 A1* | 6/2016 | Robichaud .......... G06F 16/3334 |
| | | 704/9 |
| 2017/0236512 A1* | 8/2017 | Williams ................ G06F 40/40 |
| | | 381/79 |

\* cited by examiner

*Primary Examiner* — Thomas H Maung
(74) *Attorney, Agent, or Firm* — Pierce Atwood LLP

(57) ABSTRACT

Techniques for providing and implementing a single skill associated with custom functionality and system-provided functionality are described. The skill may be used to invoke functionality in response to a user input without requiring a user remember exact formulations to cause the functionality to be performed. The skill may be associated with more than one domain. For example, the skill may be associated with custom sample user inputs (corresponding to the custom functionality) that correspond to a custom domain while the skill may also be associated with system-provided sample user inputs (corresponding to the system-provided functionality) associated with a non-custom domain.

18 Claims, 13 Drawing Sheets

US 11,868,728 B1

MULTI-DOMAIN SKILLS

CROSS-REFERENCE TO RELATED APPLICATION

This application claims the benefit of priority of U.S. Provisional Patent Application No. 62/733,418, filed Sep. 19, 2018 and titled "MULTI-DOMAIN SKILLS," in the names of Jeffery Meissner, et al., which is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data that may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
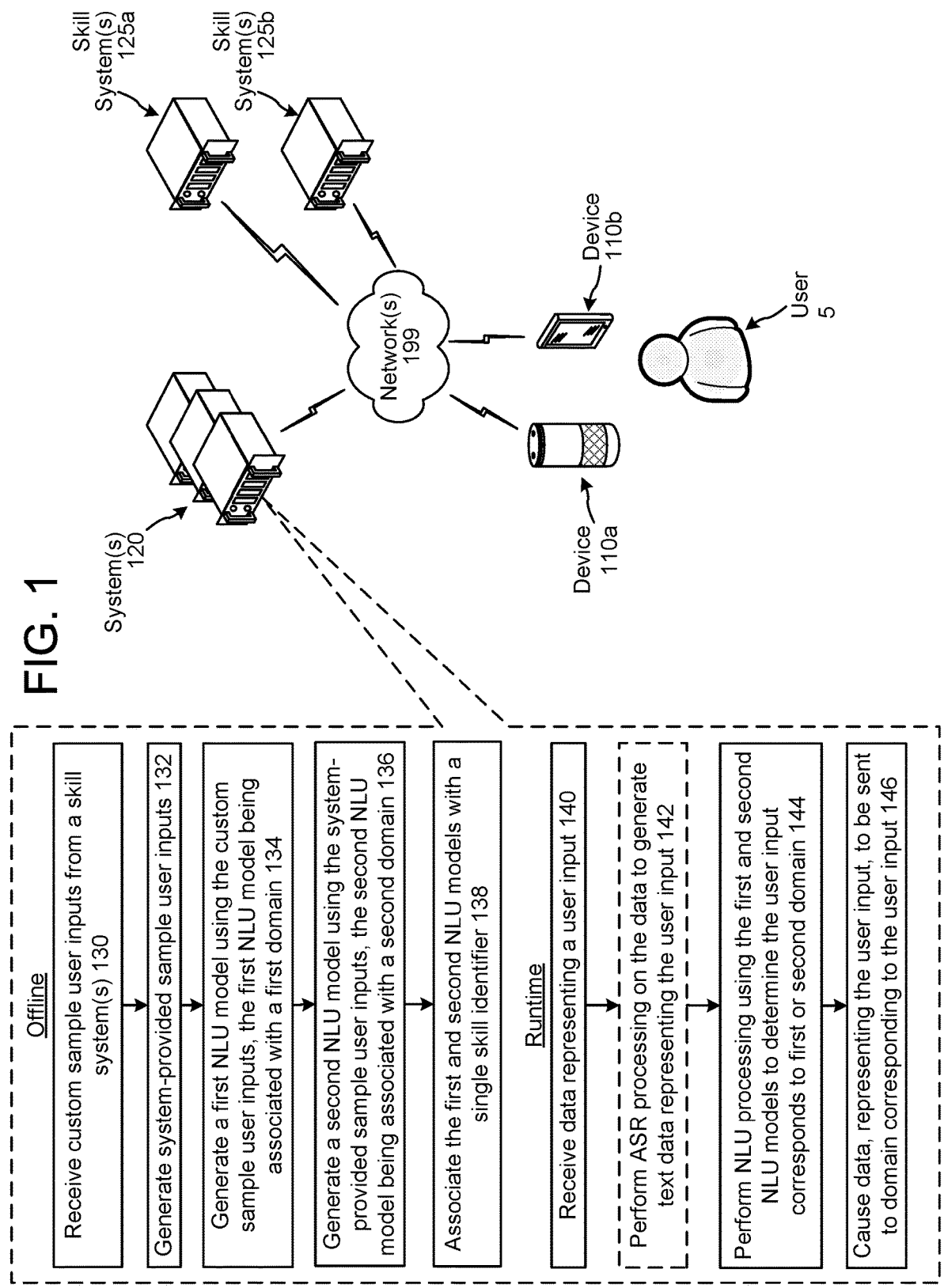
FIG. 1 illustrates a system configured to associate system-provided and custom functionality with a single skill according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions in response to user inputs. For example, for the user input of "Alexa, play Adele music," a system may output music sung by an artist named Adele. For further example, for the user input of "Alexa, turn on the lights," a system may turn on "smart" lights associated with the user's profile.

A system may be configured with skills. A "skill" may be software running on the system that is akin to a software application running on a traditional computing device. That is, a skill may enable the system to execute specific functionality in order to provide data or produce some other requested output. The software corresponding to a skill may be associated with a single skill identifier. The skill identifier may be used by the system to assign computing tasks to be performed. What is described herein as a skill may be referred to using many different terms, such as an action, bot, app, or the like.

The system may include various types of skills, which each type of skill corresponding to a different domain. A "domain" may refer to a grouping of related functionality provided by the system. Example domains include smart home, music, video, flash briefing, automotive, knowledge, health, household, communications, and custom (e.g., corresponding to skills that are not associated with any preconfigured domain).

The system may provide certain functionality for controlling a device. For example, the system may provide functionality for powering on and off smart devices, such as light switches, appliances, robotic vacuums, etc. The system may provide sample user inputs (hereinafter referred to as "system-provided sample user inputs") whose form may match expected user inputs that may be received at runtime to cause the system to perform the functionality. For example, sample user inputs for causing the system to power on and off a robotic vacuum may include "turn on my vacuum," "turn on the vacuum," "turn off my vacuum," "turn off the vacuum," etc. The system may associate the system-provided sample user inputs with a particular domain and may train system components (such as machine learned models, etc.) to recognize commands with the structure of the system-provided sample user inputs.

A smart device may be configured to function in response to system-provided functionality. In this situation, a skill developer may create a skill and cause the skill to be associated with the system-provided sample user inputs. Using the above as an example, a skill developer may create a robotic vacuum smart home skill (associated with the smart home domain) and associate the robotic vacuum smart home skill with system-provided sample user inputs that may be received at runtime to control smart vacuums. In this manner the system-provided functionality may provide a catalog of available functions that can be invoked and executed across many different devices (e.g., power on, volume adjust, etc.).

In at least some instances, a smart device may be configured to function in response to non-system provided functionality (in addition to functioning in response to system-provided functionality). Using the foregoing as an example, a robotic vacuum may be configured to be turned on and off as well as be configured to be operate according to a set schedule. But, in the above example, the system-provided sample user inputs may not necessarily provide for the set schedule functionality of the robotic vacuum. Thus, some custom configuration may occur with regard to that smart device (e.g., the robotic vacuum) in order to allow more robust controls over that device using the system.

A skill developer may create a custom skill (associated with the custom domain) configured to provide functionality not otherwise provided by the system. Using the above as an example, a skill developer may create a custom robotic vacuum skill that is associated with "custom sample user inputs" that may be provided to the system by the skill developer. Custom sample user inputs may be used to invoke a custom skill at runtime. Such custom sample user inputs may provide additional or even overlapping functionality with the system-provided functionality. For example, custom sample user inputs for a custom robotic vacuum skill may include "tell [custom skill name] to turn on the vacuum," "ask [custom skill name] to turn off the vacuum," "instruct [custom skill name] to turn on the vacuum at 10 am every day," "instruct [custom skill name] to operate in pet mode," etc. As such, one skilled in the art will appreciate that a custom skill may provide for functionality not otherwise provided by the system, but may also provide functionality already provided for by the system. Runtime invocation of such custom sample user inputs, corresponding to a custom skill, may need to include the custom skill's name as the system may be configured to invoke a custom skill only if a user input includes the custom skill's name. Thus the user in certain situations may need to say "ask [custom skill name]" to do something in order for the system to properly execute the desired instruction.

In certain situations, to allow a skill developer to take advantage of both system-provided functionality and custom functionality, a skill developer may create two skills for the same type of device (e.g., a first skill associated with system-provided sample user inputs and a second skill associated with custom sample user inputs). Creation and maintenance of two different skills to provide functionality and/or information with respect to the same or similar device type may be improved by enabling the speech processing system to associate the output of multiple domains with the same skill.

Further, in order for a user to invoke two different skills (one being associated with system-provided functionality and with system-provided sample user inputs, and the second being associated with custom functionality and with custom sample user inputs), the user may be required to separately enable each of the skills with respect to their user profile. Such may result in an unbeneficial user/system interface because the skills, in a skill catalog, may appear to be identical (e.g., the only differences may be that the skill names are slightly different and the user inputs for each skill are slightly different, but the functionality provided with respect to each skill is similar or identical), thereby resulting in user confusion.

The present disclosure improves such a system by enabling custom functionality (e.g., corresponding to custom sample user inputs) and system-provided functionality (e.g., corresponding to system-provided sample user inputs) to be associated with a single skill. This enables a single skill to be presented and enabled by a user where the single skill may correspond to both system-provided functionality and custom functionality. After the user enables the single skill with respect to their user profile, the user is able to cause the system to process user inputs corresponding to both the custom and system-provided sample user inputs. This provides improved skill developer/system and user/system interfaces.

The single skill configuration of the present disclosure may enable functionality to be provided in response to a user input without requiring a user remember exact formulations to cause the functionality to be performed. For example, a user may cause a robotic vacuum to be turned on by providing the system with either the user input "turn on my vacuum" or "have [skill name] turn on my vacuum."

A skill of the present disclosure may be associated with more than one domain. As described above, system-provided functionality (e.g., corresponding to system-provided sample user inputs) may be associated with a smart home domain and corresponding custom functionality (e.g., corresponding to custom sample user inputs) may be associated with a custom domain. When system-provided functionality and custom functionality are associated with a single skill, the resulting skill may be associated with each of the domains to which the underlying functionalities are associated. Using the above an example, the skill may be associated with the smart home domain as well as the custom domain.

While robotic vacuums and corresponding sample user inputs and skills are described above, one skilled in the art will appreciate that the teachings herein may be altered for other types of smart devices and to provide other functionality.

FIG. 1 illustrates a system configured to associate system-provided and custom functionality with a single skill. Although the figures and discussion illustrate certain operational steps of the system in a particular order, the steps described may be performed in a different order (as well as certain steps removed or added) without departing from the intent of the disclosure. As illustrated in FIG. 1, the system may include one or more devices (110a/110b) local to a user 5, one or more systems 120, and one or more skill systems 125 connected across one or more networks 199.

Figure 2:
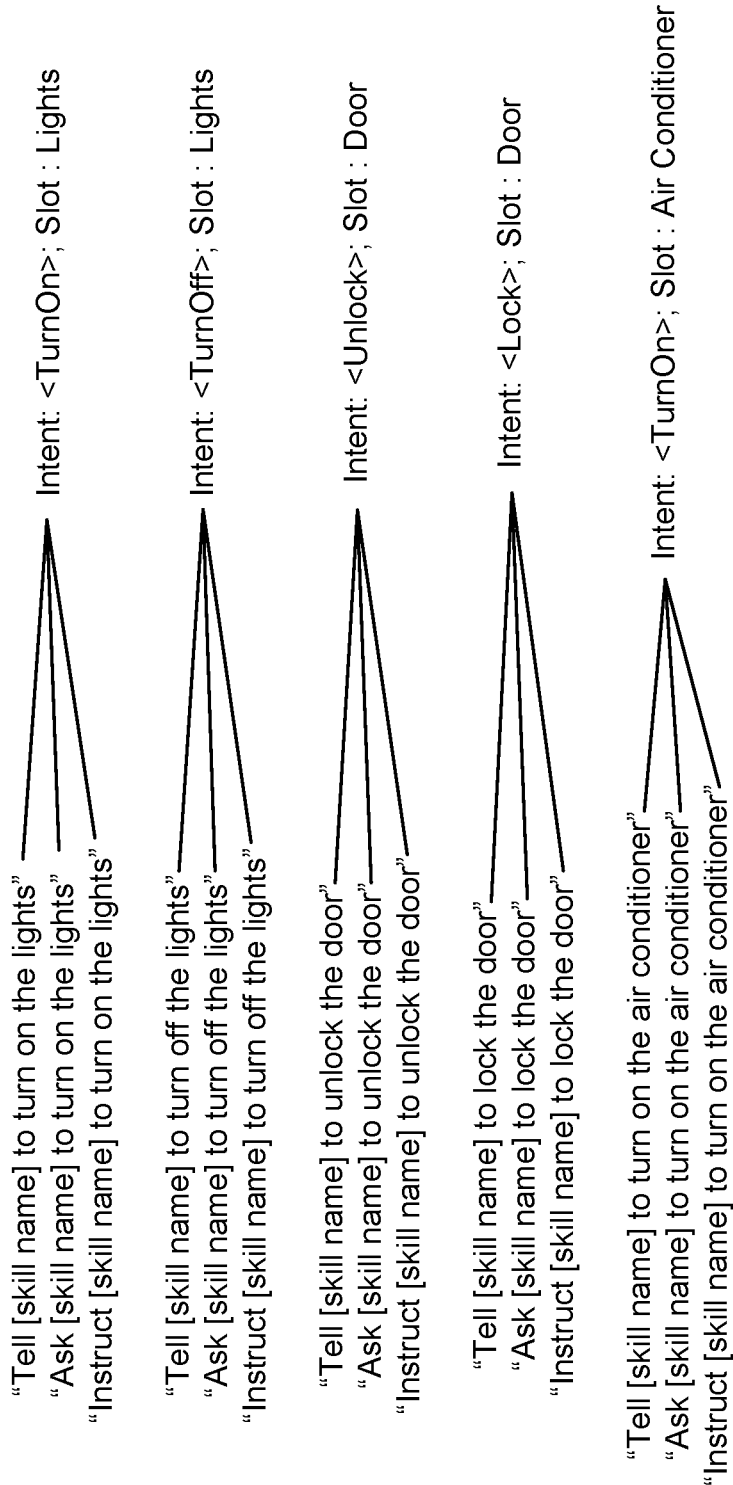
FIG. 2 is a conceptual diagram of custom sample user inputs according to embodiments of the present disclosure.

The system(s) 120 may receive (130) custom sample user inputs from a skill system(s) 130 associated with a skill developer. The custom sample user inputs may correspond to custom functionality associated with the custom domain since they are custom to the skill developer. The custom sample user inputs may be received as text data. FIG. 2 illustrates example custom sample user inputs configured to control smart lights, smart locks, and smart air conditioners. One skilled in the art will appreciate that other custom sample user inputs may be used for other types of devices, such as robotic vacuums, smart thermostats, etc. A custom sample user input may include an invocation name of a corresponding skill.

As illustrated in the left portion of FIG. 2, the custom sample user inputs may be configured in sentence structures. As illustrated in the right portion of FIG. 2, the custom sample user inputs may also or alternatively be configured as grammar frameworks with slots. Each slot of a grammar framework corresponds to a grammatical portion of a user input. For example, the custom sample user inputs of "tell [skill name] to turn on the lights," "ask [skill name] to turn on the lights," and "instruct [skill name] to turn on the lights" may each correspond to a single grammar framework corresponding to a<TurnOn>intent and having a slot representing the device(s) to be acted up (e.g., lights). Likewise, for example, the user inputs of "tell [skill name] to turn off the lights," "ask [skill name] to turn off the lights," and "instruct [skill name] to turn off the lights" may each correspond to a single grammar framework corresponding to a <TurnOff>intent and having a slot representing the device(s) to be acted on (e.g., lights). More complex grammar frameworks with more than one slot are possible.

Figure 3:
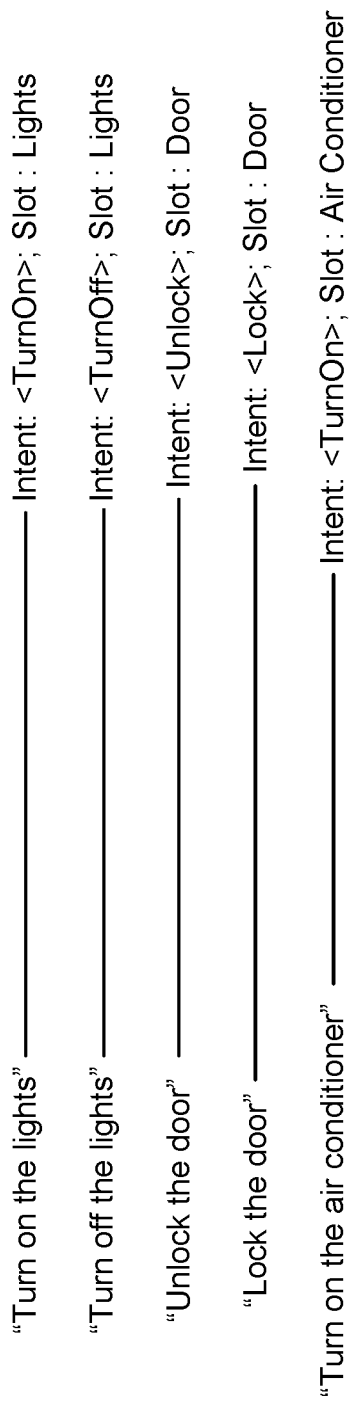
FIG. 3 is a conceptual diagram of a system-provided sample user inputs according to embodiments of the present disclosure.

Referring back to FIG. 1, the system(s) 120 may generate (132) system-provided sample user inputs corresponding to system-provided functionality. The system-provided sample user inputs may correspond to a pre-established domain, such as smart home, movie, video, flash briefing, etc. FIG. 3 illustrates example system-provided sample user inputs configured to control smart lights, smart locks, and smart air conditioners. One skilled in the art will appreciate that other system-provided sample user inputs may be used for other types of devices, such as robotic vacuums, smart thermostats, etc. Unlike a custom sample user input, a corresponding system-provided sample user input may not include an invocation name of a skill.

As illustrated in the left portion of FIG. 3, the system-provided sample user inputs may be configured in sentence structures. As illustrated in the right portion of FIG. 3, the system-provided sample user inputs may also or alternatively be configured as grammar frameworks with slots. It may be noted that whereby a single grammar framework of a custom sample user input may correspond to more than one sentence structure (as illustrated in FIG. 2), there may be a one-to-one correlation between a grammar framework of a system-provided sample user input and a sentence structure. This may be, in part, due to custom sample user inputs being configured with skill names embedded therein, and that a skill may be asked or instructed to do the same thing using a variety of different user input formulations.

Referring back to FIG. 1, the system(s) 120 may generate (134) a first NLU model (e.g., a first statistical model) using the custom sample user inputs. The first NLU model may correspond to first domain. In an example, the first NLU model may correspond to a custom domain. The first NLU model may be used by a NLU component to determine, at runtime, when a user input corresponds to the first domain. The first NLU model, and corresponding first domain, may be associated with a first skill system(s) 125a. An NLU model may be generated using text data corresponding to sample invocation phrases that may be spoken (or typed, etc.) by a user to invoke a particular skill, command, function, etc.

The system(s) 120 may generate (136) a second NLU model (e.g., a second statistical model) using the system-provided sample user inputs. The second NLU model may corresponds to a second domain, different from the first domain. For example, the second NLU model may correspond to a smart home domain, communications domain, etc. The second NLU model may be used by a NLU component to determine, at runtime, when a user input corresponds to the second domain. The second NLU model, and corresponding second domain, may be associated with a second skill system(s) 125b.

The system(s) 120 may associate (138) the first and second NLU models with a single skill identifier, corresponding to a single skill that may be enabled by a user. The skill may thus be associated with each domain to which the underlying NLU models correspond. For example, if the first NLU model corresponds to the custom domain and the second NLU model corresponds to the smart home domain, the skill may be associated with both the custom and smart home domains. A skill may be associated with more than two domains in at least some instances.

Thereafter, if the user 5 enables the skill in a skill catalog, for example, the system(s) 120 may enable both the first and second NLU models for purposes of processing user inputs of that user 5. This is in contrast to at least some systems, which may require the user 5 to enable two different skills (e.g., a first skill associated with the first NLU model and a second skill associated with the second NLU model). According to those systems, if the user 5 were to only enable one of the skills, the user 5 would be limited to speaking inputs corresponding to either the first or second NLU models, but not both. If the user attempted to provide a user input formulated according to the non-enabled NLU model, a failure condition would occur. A failure condition refers to, in some instances, NLU processing being unable to understand the user input because the user input does not correspond to an enabled NLU model. According to the present disclosure, once the user enables the single skill, the user is able to provide user inputs corresponding to custom and system-provided functionality (e.g., that are formulated to either the first or second NLU models). Although the user only needs to enable a single skill and a same action may be performed in response to a user input regardless of whether the user input conforms to the first or second NLU models, the system(s) 120 may perform different processes to perform the action depending on what NLU model the user input corresponds to. This is described in detail below with respect to, for example, FIGS. 9A and 9B.

As noted in FIG. 1, steps 130 through 138 may occur during offline operations.

At runtime, the device 110a may receive audio representing a spoken user input. The device 110a may generate audio data representing the audio and may send the audio data to the system(s) 120, which the system(s) 120 receives (140). The device 110b may receive a text-based user input via a graphical user interface (GUI). The device 110b may generate text data representing the text-based user input and may send the text data to the system(s) 120, which the system(s) 120 receives (140). The device(s) (110a/110b) may send the audio and/or text data to the system(s) 120 via a companion application installed on the device(s) (110a/110b). A companion application may enable a device 110 to communicate with the system(s) 120 via the network(s) 199. An example companion application is the Amazon Alexa application that may be installed on the smart phone, tablet, or the like.

If the system(s) 120 receives audio data, the system(s) 120 may perform (142) ASR processing on the audio data to generate text data representing the user input. The system(s) 120 may perform (144) NLU processing on text data (e.g., received from the device 110b or generated by ASR processing) using the first and second NLU models to determine whether the user input corresponds to the first or second domain. The system(s) 120 thereafter causes (146) data, representing the user input, to be sent to the domain corresponding to the user input (e.g., either the first or second domain).

As described herein below, a skill (associated with both custom and system-provided functionality) may not be indicated in NLU output data unless the skill has been enabled by the user that originated the user input being processed. In some examples, a skill (associated with both custom and system-provided functionality) may be indicated in NLU output data even if the user has not enabled the skill. In such examples, the skill may only be indicated in NLU output data if the custom and system-provided functionalities are associated with a geographic location to which the device (that captured the user input) corresponds.

Figure 4:
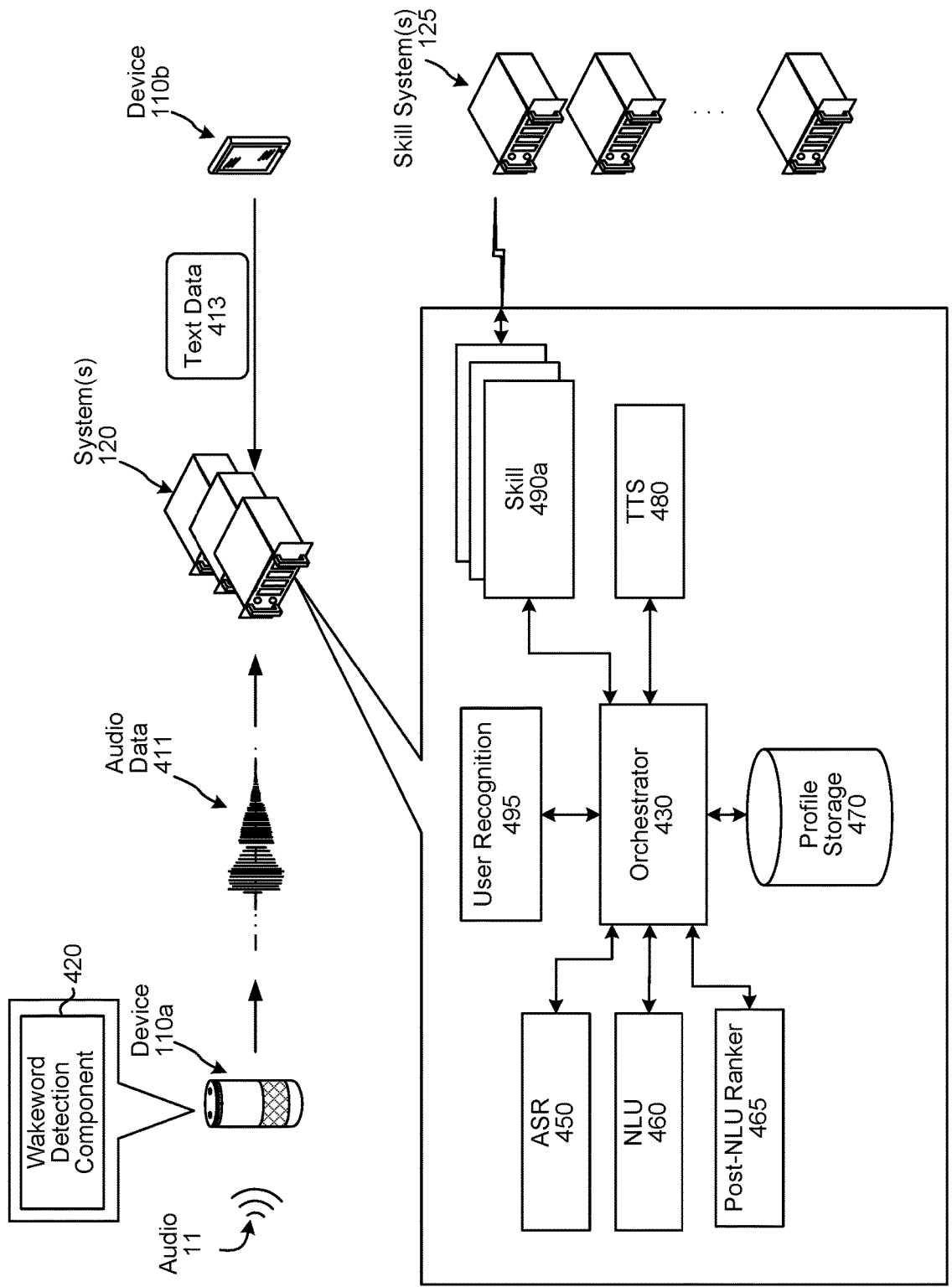
FIG. 4 is a conceptual diagram of components of a system according to embodiments of the present disclosure.

The overall system of the present disclosure may operate using various components as illustrated in FIG. 4. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 420 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 420 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 411, representing the audio 11, to the system(s) 120. The audio data 411 may include data corresponding to the wakeword, or the device 110*a* may remove the portion of the audio corresponding to the wakeword prior to sending the audio data 411 to the system(s) 120.

An orchestrator component 430 may receive the audio data 411. The orchestrator component 430 may include memory and logic that enables the orchestrator component 430 to transmit various pieces and forms of data to various components of the system, as well as perform other operations.

The orchestrator component 430 sends the audio data 411 to an ASR component 450. The ASR component 450 transcribes the audio data 411 into text data. The text data output by the ASR component 450 represents one or more than one (e.g., in the form of an n-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., subword units, such as phonemes, etc.) and sequences of sounds to identify words that match the sequence of sounds of the speech represented in the audio data 411. The ASR component 450 outputs text data representing one or more ASR hypotheses. The text data output by the ASR component 450 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 413 representing the text-based user input. The device 110*a* may send the text data 413 to the system(s) 120. The orchestrator component 430 may receive the text data 413.

The orchestrator component 430 may send text data (e.g., text data output by the ASR component 450 or the received text data 413) to an NLU component 460.

The NLU component 460 attempts to make a semantic interpretation of the phrase(s) or statement(s) represented in the received text data. That is, the NLU component 460 determines one or more meanings associated with the phrase(s) or statement(s) represented in the text data based on words represented in the text data. The NLU component 460 determines an intent representing an action that a user desires be performed as well as pieces of the text data that allow a device (e.g., the device 110, the system(s) 120, a skill 490, a skill system(s) 125, etc.) to execute the intent. For example, if the text data corresponds to "play Adele music," the NLU component 460 may determine an intent that the system(s) 120 output music and may identify "Adele" as an artist. For further example, if the text data corresponds to "what is the weather," the NLU component 460 may determine an intent that the system(s) 120 output weather information associated with a geographic location of the device 110. In another example, if the text data corresponds to "turn off the lights," the NLU component 460 may determine an intent that the system(s) 120 turn off lights associated with the device(s) 110 or the user(s) 5. The NLU component 460 may send NLU results data (which may include tagged text data, indicators of intent, etc.).

The system(s) 120 may include one or more skills 490. A "skill" may be software running on the system(s) 120 that is akin to a software application running on a traditional computing device. That is, a skill 490 may enable the system(s) 120 to execute specific functionality in order to provide data or produce some other requested output. The system(s) 120 may be configured with more than one skill 490. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 490 may operate in conjunction between the system(s) 120 and other devices, such as the device 110, in order to complete certain functions. Inputs to a skill 490 may come from speech processing interactions or through other interactions or input sources. A skill 490 may include hardware, software, firmware, or the like that may be dedicated to a particular skill 490 or shared among different skills 490.

In addition or alternatively to being implemented by the system(s) 120, a skill 490 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 490 dedicated to interacting with more than one skill system 125.

Unless expressly stated otherwise, reference to a skill, skill device, skill component, or the like herein may include a skill 490 operated by the system(s) 120 and/or skill operated by the skill system(s) 125. Moreover, the functionality described herein as a skill may be referred to using many different terms, such as an action, bot, app, or the like.

The system(s) 120 may include a post-NLU ranker 465 that receives NLU results data and determines (as described in detail herein) which skill the system(s) 120 should invoke to execute with respect to the user input. The post-NLU ranker 465 may be implemented separately from the orchestrator component 430 (as illustrated) or one or more components of the post-NLU ranker 465 may be implemented as part of the orchestrator component 430.

The system(s) 120 may include a TTS component 480. The TTS component 480 may generate audio data (e.g., synthesized speech) from text data using one or more different methods. Text data input to the TTS component 480 may come from a skill 490, the orchestrator component 430, or another component of the system(s) 120.

In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The system(s) 120 may include profile storage 470. The profile storage 470 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 470 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 470 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 470 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 5:
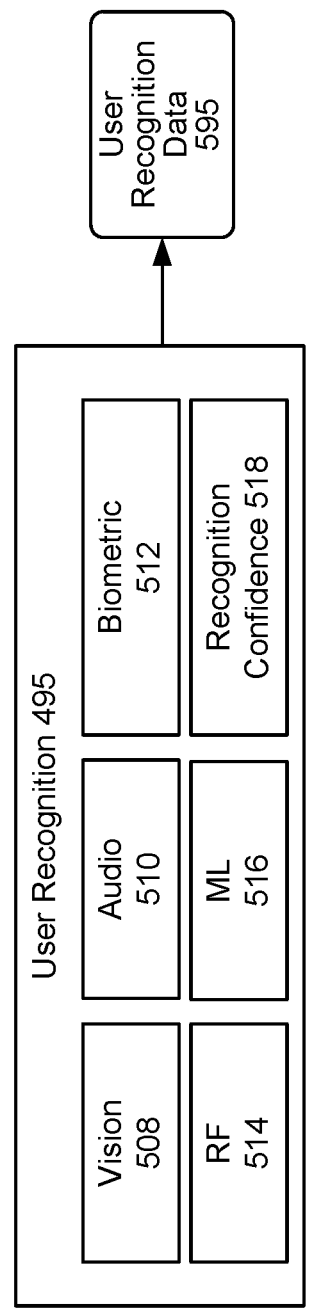
FIG. 5 is a schematic diagram of an illustrative architecture in which sensor data is combined to recognize one or more users according to embodiments of the present disclosure.

The system(s) 120 may include a user recognition component 495 that recognizes one or more users using a variety of data. As illustrated in FIG. 5, the user recognition component 495 may include one or more subcomponents including a vision component 508, an audio component 510, a biometric component 512, a radio frequency (RF) component 514, a machine learning (ML) component 516, and a recognition confidence component 518. In some instances, the user recognition component 495 may monitor data and determinations from one or more subcomponents to determine an identity of one or more users associated with data input to the system(s) 120. The user recognition component 495 may output user recognition data 595, which may include a user identifier associated with a user the user recognition component 495 believes originated data input to the system(s) 120. The user recognition data 595 may be used to inform processes performed by various components of the system(s) 120.

The vision component 508 may receive data from one or more sensors capable of providing images (e.g., cameras) or sensors indicating motion (e.g., motion sensors). The vision component 508 can perform facial recognition or image analysis to determine an identity of a user and to associate that identity with a user profile associated with the user. In some instances, when a user is facing a camera, the vision component 508 may perform facial recognition and identify the user with a high degree of confidence. In other instances, the vision component 508 may have a low degree of confidence of an identity of a user, and the user recognition component 495 may utilize determinations from additional components to determine an identity of a user. The vision component 508 can be used in conjunction with other components to determine an identity of a user. For example, the user recognition component 495 may use data from the vision component 508 with data from the audio component 510 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 512. For example, the biometric component 512 may receive data corresponding to fingerprints, iris or retina scans, thermal scans, weights of users, a size of a user, pressure (e.g., within floor sensors), etc., and may determine a biometric profile corresponding to a user. The biometric component 512 may distinguish between a user and sound from a television, for example. Thus, the biometric component 512 may incorporate biometric information into a confidence level for determining an identity of a user. Biometric information output by the biometric component 512 can be associated with specific user profile data such that the biometric information uniquely identifies a user profile of a user.

The RF component 514 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 514 the strength of the signal (e.g., as a received signal strength indication (RSSI)). The RF component 514 may use the RSSI to determine an identity of a user (with an associated confidence level). In some instances, the RF component 514 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 516 may track the behavior of various users as a factor in determining a confidence level of the identity of the user. By way of example, a user may adhere to a regular schedule such that the user is at a first location during the day (e.g., at work or at school). In this example, the ML component 516 would factor in past behavior and/or trends in determining the identity of the user that provided input to the system(s) 120. Thus, the ML component 516 may use historical data and/or usage patterns over time to increase or decrease a confidence level of an identity of a user.

In at least some instances, the recognition confidence component 518 receives determinations from the various components 508, 510, 512, 514, and 516, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 595.

The audio component 510 may receive data from one or more sensors capable of providing an audio signal (e.g., one or more microphones) to facilitate recognition of a user. The audio component 510 may perform audio recognition on an audio signal to determine an identity of the user and associated user identifier. In some instances, aspects of the system(s) 120 may be configured at a computing device (e.g., a local server). Thus, in some instances, the audio component 510 operating on a computing device may analyze all sound to facilitate recognition of a user. In some instances, the audio component 510 may perform voice recognition to determine an identity of a user.

The audio component 510 may also perform user identification based on audio data 411 input into the system(s) 120 for speech processing. The audio component 510 may determine scores indicating whether speech in the audio data 411 originated from particular users. For example, a first score may indicate a likelihood that speech in the audio data 411 originated from a first user associated with a first user identifier, a second score may indicate a likelihood that speech in the audio data 411 originated from a second user associated with a second user identifier, etc. The audio component 510 may perform user recognition by comparing speech characteristics represented in the audio data 411 to stored speech characteristics of users (e.g., stored voice profiles associated with the device 110 that captured the spoken user input).

Figure 6:
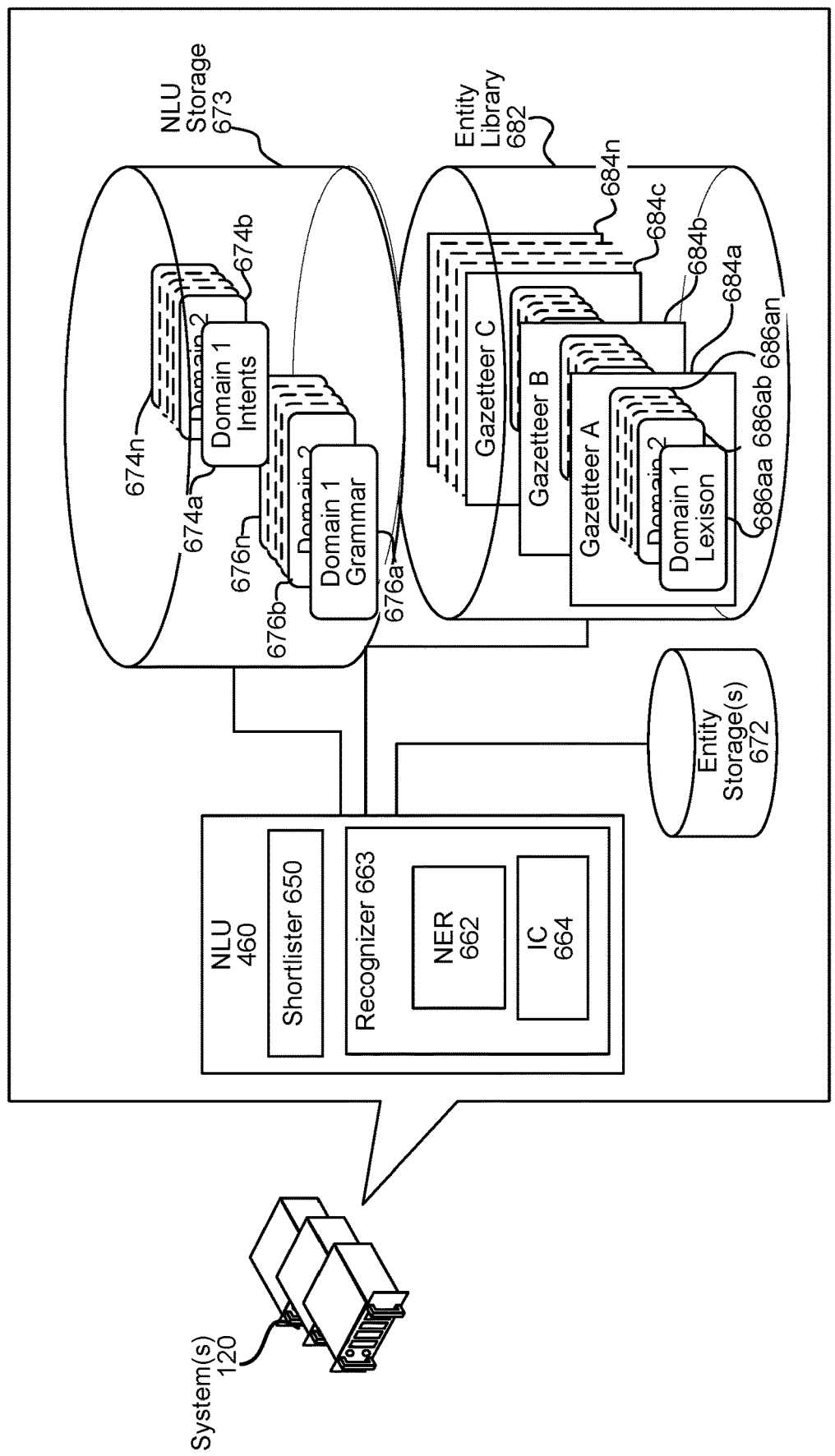
FIG. 6 is a conceptual diagram illustrating how NLU processing may be performed according to embodiments of the present disclosure.

FIG. 6 illustrates how NLU processing is performed on text data. The NLU component 460 may process text data including several ASR hypotheses of a single user input. For example, if the ASR component 450 outputs text data including an n-best list of ASR hypotheses, the NLU component 460 may process the text data with respect to all (or a portion of) the ASR hypotheses represented therein.

The NLU component 460 may annotate text data by parsing and/or tagging the text data. For example, for the text data "tell me the weather for Seattle," the NLU component 460 may tag "tell me the weather for Seattle" as an <OutputWeather>intent as well as separately tag "Seattle" as a location for the weather information.

The NLU component 460 may include a shortlister component 650. The shortlister component 650 selects skills that may execute with respect to text data 710 input to the NLU component 460 (e.g., applications that may execute with respect to the user input). The shortlister component 650 thus limits downstream, more resource intensive NLU processes to being performed with respect to skills that may execute with respect to the user input.

Without a shortlister component 650, the NLU component 460 may process text data 710 input thereto with respect to every skill of the system, either in parallel, in series, or using some combination thereof. By implementing a shortlister component 650, the NLU component 460 may process text data 710 with respect to only the skills that may execute with respect to the user input. This reduces total compute power and latency attributed to NLU processing.

The shortlister component 650 may include one or more trained models. The model(s) may be trained to recognize various forms of user inputs that may be received by the system(s) 120. For example, during a training period, a skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 650 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 650 may be trained with respect to a different skill. Alternatively, the shortlister component 650 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 650. For example, some sample user inputs may be positive examples (e.g., user inputs that may be used to invoke the skill). Other sample user inputs may be negative examples (e.g., user inputs that may not be used to invoke the skill).

As described above, the shortlister component 650 may include a different trained model for each skill of the system, a different trained model for each domain, or some other combination of trained model(s). For example, the shortlister component 650 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 650 to output indications of only a portion of the skills that the text data 710 may relate to. For example, a user input may correspond to "tell me about Tom Collins." If the model is clustered based on domain, the shortlister component 650 may determine the user input corresponds to a recipe skill (e.g., a drink recipe) even though the user input may also correspond to an information skill (e.g., including information about a person named Tom Collins).

Training the shortlister component 650 may require establishing a "ground truth" for the training examples input therein. The shortlister component 650 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score"

indicating which category the data most closely matches. The score may provide an indication of how closely the data matches the category.

The NLU component 460 may include one or more recognizers 663. Each recognizer 663 may be associated with a different domain (e.g., smart home, video, music, weather, custom, etc.).

If the shortlister component 650 determines text data 710 is potentially associated with multiple domains, the recognizers 663 associated with the domains may process the text data 710, while recognizers 663 not indicated in the shortlister component 650's output may not process the text data 710. The "shortlisted" recognizers 663 may process the text data 710 in parallel, in series, partially in parallel, etc. For example, if text data 710 potentially relates to both a communications domain and a music domain, a recognizer associated with the communications domain may process the text data 710 in parallel, or partially in parallel, with a recognizer associated with the music domain processing the text data 710.

Each recognizer 663 may include a named entity recognition (NER) component 662. The NER component 662 attempts to identify grammars and lexical information that may be used to construe meaning with respect to text data input therein. The NER component 662 identifies portions of text data that correspond to a named entity associated with a domain, associated with the recognizer 663 implementing the NER component 662. The NER component 662 (or other component of the NLU component 460) may also determine whether a word refers to an entity whose identity is not explicitly mentioned in the text data, for example "him," "her," "it" or other anaphora, exophora, or the like.

Each recognizer 663, and more specifically each NER component 662, may be associated with a particular grammar database 676, a particular set of intents/actions 674, and a particular personalized lexicon 686. Each gazetteer 684 may include domain-indexed lexical information associated with a particular user and/or device 110. For example, a Gazetteer A (684a) includes domain-indexed lexical information 686aa to 686an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 662 applies grammar information 676 and lexical information 686 associated with a domain (associated with the recognizer 663 implementing the NER component 662) to determine a mention of one or more entities in text data. In this manner, the NER component 662 identifies "slots" (each corresponding to one or more particular words in text data) that may be useful for later processing. The grammar information 676 and/or lexical information 686 may include (or be configured based on) the custom and system-provided sample user inputs described herein. The NER component 662 may also label each slot with a type (e.g., noun, place, city, artist name, song name, etc.).

Each grammar database 676 includes the names of entities (i.e., nouns) commonly found in speech about the particular domain to which the grammar database 676 relates, whereas the lexical information 686 is personalized to the user and/or the device 110 from which the user input originated. For example, a grammar database 676 associated with a shopping domain may include a database of words commonly used when people discuss shopping.

A downstream process called entity resolution (discussed in detail elsewhere herein) links a slot of text data to a specific entity known to the system. To perform entity resolution, the NLU component 460 may utilize gazetteer information (684a-684n) stored in an entity library storage 682. The gazetteer information 684 may be used to match text data (representing a portion of the user input) with text data representing known entities, such as song titles, contact names, etc. Gazetteers 684 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 663 may also include an intent classification (IC) component 664. An IC component 664 parses text data to determine an intent(s) (associated with the domain associated with the recognizer 663 implementing the IC component 664) that potentially represents the user input. An intent represents to an action a user desires be performed. An IC component 664 may communicate with a database 674 of words linked to intents. For example, a music intent database may link words and phrases such as "quiet," "volume off," and "mute" to a <Mute>intent. An IC component 664 identifies potential intents by comparing words and phrases in text data (representing at least a portion of the user input) to the words and phrases in an intents database 674 (associated with the domain that is associated with the recognizer 663 implementing the IC component 664). An intents database 674 may include (or be configured based on) the custom and system-provided sample user inputs described herein.

The intents identifiable by a specific IC component 664 are linked to domain-specific (i.e., the domain associated with the recognizer 663 implementing the IC component 664) grammar frameworks 676 with "slots" to be filled. Each slot of a grammar framework 676 corresponds to a portion of text data that the system believes corresponds to an entity. For example, a grammar framework 676 corresponding to a <PlayMusic>intent may correspond to text data sentence structures such as "Play {Artist Name}," "Play {Album Name}," "Play {Song name}," "Play {Song name} by {Artist Name}," etc. However, to make entity resolution more flexible, grammar frameworks 676 may not be structured as sentences, but rather based on associating slots with grammatical tags.

For example, an NER component 662 may parse text data to identify words as subject, object, verb, preposition, etc. based on grammar rules and/or models prior to recognizing named entities in the text data. An IC component 664 (implemented by the same recognizer 663 as the NER component 662) may use the identified verb to identify an intent. The NER component 662 may then determine a grammar model 276 associated with the identified intent. For example, a grammar model 676 for an intent corresponding to <PlayMusic> may specify a list of slots applicable to play the identified "object" and any object modifier (e.g., a prepositional phrase), such as {Artist Name}, {Album Name}, {Song name}, etc. The NER component 662 may then search corresponding fields in a lexicon 686 (associated with the domain associated with the recognizer 663 implementing the NER component 662), attempting to match words and phrases in text data the NER component 662 previously tagged as a grammatical object or object modifier with those identified in the lexicon 686.

An NER component 662 may perform semantic tagging, which is the labeling of a word or combination of words according to their type/semantic meaning. An NER component 662 may parse text data using heuristic grammar rules, or a model may be constructed using techniques such as Hidden Markov Models, maximum entropy models, log linear models, conditional random fields (CRF), and the like. For example, an NER component 662 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 662 identifies "Play" as a verb based on a word database associated with the music domain, which an IC component 664 (also implemented by the music domain recognizer) may determine corresponds to a <PlayMusic>intent. At this stage, no determination has been made as to the meaning of "mother's little helper" or "the rolling stones," but based on grammar rules and models, the NER component 662 has determined the text of these phrases relates to the grammatical object (i.e., entity) of the user input represented in the text data.

An NER component 662 may tag text data to attribute meaning thereto. For example, an NER component 662 may tag "play mother's little helper by the rolling stones" as: {domain} Music, {intent}<PlayMusic>, {artist name} rolling stones, {media type} SONG, and {song title} mother's little helper. For further example, the NER component 662 may tag "play songs by the rolling stones" as: {domain} Music, {intent}<PlayMusic>, {artist name} rolling stones, and {media type} SONG.

The custom sample user inputs (received from a skill system(s) 125) and the system-provided sample user inputs may form bases for grammar databases 676 and/or intent databases 674. For example, custom sample user inputs may be associated with a custom domain grammar database and/or a custom domain intent database. For further example, system-provided sample user inputs may be associated a non-custom domain grammar database and/or a non-custom intent database.

Figure 7:
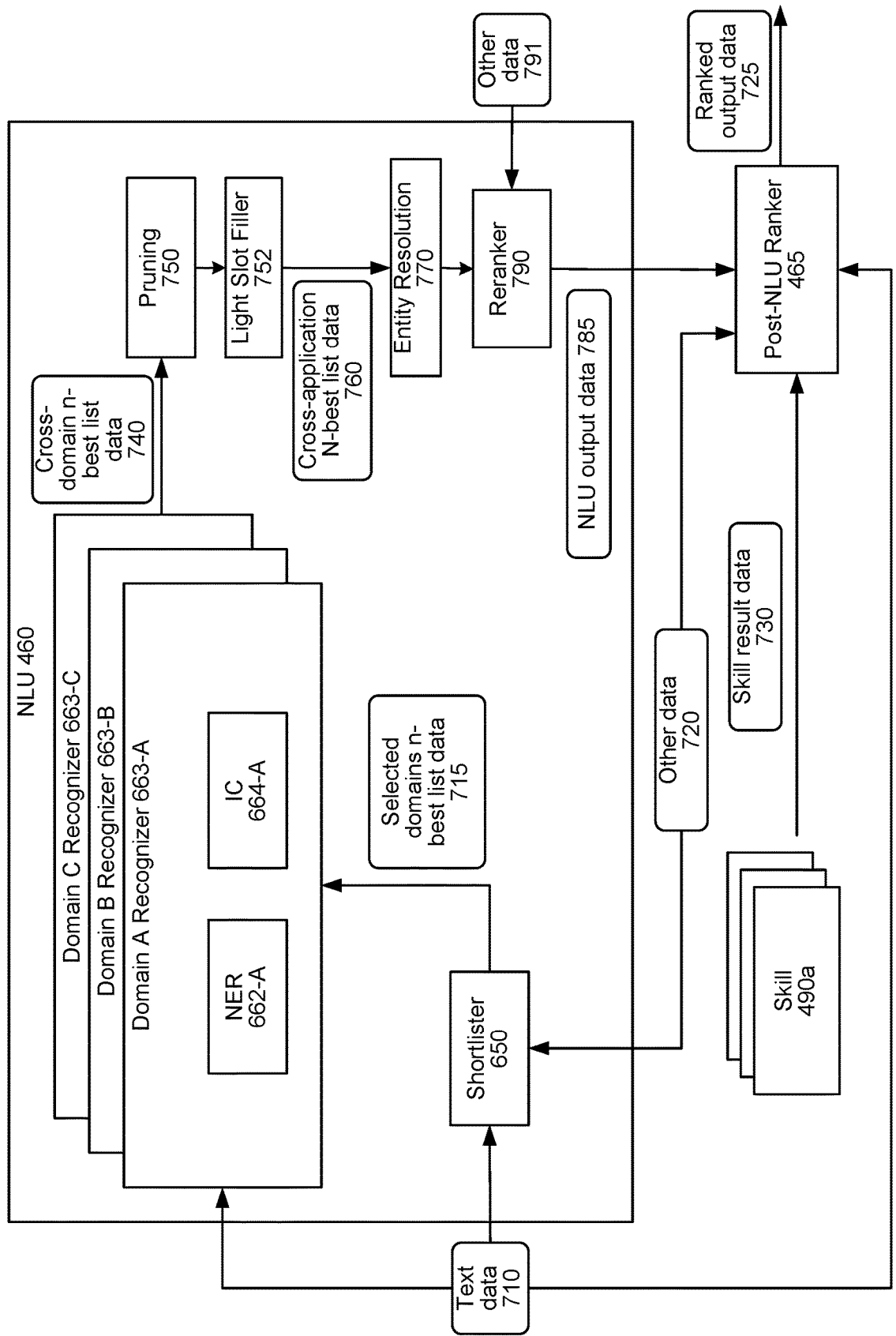
FIG. 7 is a conceptual diagram illustrating how NLU processing may be performed according to embodiments of the present disclosure.

The shortlister component 650 may receive text data 710 output from the ASR component 450 or output from the device 110b (as illustrated in FIG. 7). The ASR component 450 may embed the text data 710 into a form processable by a trained model(s) using sentence embedding techniques as known in the art. Sentence embedding results in the text data 710 including text in a structure that enables the trained models of the shortlister component 750 to operate on the text data 710. For example, an embedding of the text data 710 may be a vector representation of the text data 710.

The shortlister component 650 may make binary determinations (e.g., yes or no) regarding which domains relate to the text data 710. The shortlister component 650 may make such determinations using the one or more trained models described herein above. If the shortlister component 650 implements a single trained model for each domain, the shortlister component 650 may simply run the models that are associated with enabled domains as indicated in a user profile associated with the device 110 and/or user that originated the user input.

The shortlister component 650 may generate n-best list data 715 representing domains that may execute with respect to the user input represented in the text data 710. The size of the n-best list represented in the n-best list data 715 is configurable. In an example, the n-best list data 715 may indicate every domain of the system as well as contain an indication, for each domain, regarding whether the domain is likely capable to execute the user input represented in the text data 710. In another example, instead of indicating every domain of the system, the n-best list data 715 may only indicate the domains that are likely to be able to execute the user input represented in the text data 710. In yet another example, the shortlister component 650 may implement thresholding such that the n-best list data 715 may indicate no more than a maximum number of domains that may execute the user input represented in the text data 710. In an example, the threshold number of domains that may be represented in the n-best list data 715 is ten. In another example, the domains included in the n-best list data 715 may be limited by a threshold a score, where only domains indicating a likelihood to handle the user input is above a certain score (as determined by processing the text data 710 by the shortlister component 650 relative to such domains) are included in the n-best list data 715.

The text data 710 may correspond to more than one ASR hypothesis. When this occurs, the shortlister component 650 may output a different n-best list (represented in the n-best list data 715) for each ASR hypothesis. Alternatively, the shortlister component 650 may output a single n-best list representing the domains that are related to the multiple ASR hypotheses represented in the text data 710.

As indicated above, the shortlister component 650 may implement thresholding such that an n-best list output therefrom may include no more than a threshold number of entries. If the text data 710 includes more than one ASR hypothesis, the n-best list output by the shortlister component 650 may include no more than a threshold number of entries irrespective of the number of ASR hypotheses output by the ASR component 450. Alternatively or in addition, the n-best list output by the shortlister component 650 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 710, the shortlister component 650 may generate confidence scores representing likelihoods that domains relate to the text data 710. If the shortlister component 650 implements a different trained model for each domain, the shortlister component 650 may generate a different confidence score for each individual domain trained model that is run. If the shortlister component 650 runs the models of every domain when text data 710 is received, the shortlister component 650 may generate a different confidence score for each domain of the system. If the shortlister component 650 runs the models of only the domains that are associated with skills indicated as enabled in a user profile associated with the device 110 and/or user that originated the user input, the shortlister component 650 may only generate a different confidence score for each domain associated with at least one enabled skill. If the shortlister component 650 implements a single trained model with domain specifically trained portions, the shortlister component 650 may generate a different confidence score for each domain who's specifically trained portion is run. The shortlister component 650 may perform matrix vector modification to obtain confidence scores for all domains of the system in a single instance of processing of the text data 710.

N-best list data 715 including confidence scores that may be output by the shortlister component 650 may be represented as, for example:

Search domain, 0.67
Recipe domain, 0.62
Information domain, 0.57
Shopping domain, 0.42

As indicated, the confidence scores output by the shortlister component 650 may be numeric values. The confidence scores output by the shortlister component 650 may alternatively be binned values (e.g., high, medium, low).

The n-best list may only include entries for domains having a confidence score satisfying (e.g., equaling or exceeding) a minimum threshold confidence score. Alternatively, the shortlister component 650 may include entries for all domains associated with user enabled skills, even if one or more of the domains are associated with confidence scores that do not satisfy the minimum threshold confidence score.

The shortlister component 650 may consider other data 720 when determining which domains may relate to the user input represented in the text data 710 as well as respective confidence scores. The other data 720 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 720 may include an indicator of the user associated with the text data 710, for example as determined by the user recognition component 495.

The other data 720 may be character embedded prior to being input to the shortlister component 650. The other data 720 may alternatively be embedded using other techniques known in the art prior to being input to the shortlister component 650.

The other data 720 may also include data indicating the domains associated with skills that are enabled with respect to the device 110 and/or user that originated the user input. The shortlister component 650 may use such data to determine which domain-specific trained models to run. That is, the shortlister component 650 may determine to only run the trained models associated with domains that are associated with user-enabled skills. The shortlister component 650 may alternatively use such data to alter confidence scores of domains.

As an example, considering two domains, a first domain associated with at least one enabled skill and a second domain not associated with any user-enabled skills of the user that originated the user input, the shortlister component 650 may run a first model specific to the first domain as well as a second model specific to the second domain. Alternatively, the shortlister component 650 may run a model configured to determine a score for each of the first and second domains. The shortlister component 650 may determine a same confidence score for each of the first and second domains in the first instance. The shortlister component 650 may then alter those confidence scores based on which domains is associated with at least one skill enabled by the present user. For example, the shortlister component 650 may increase the confidence score associated with the domain associated with at least one enabled skill while leaving the confidence score associated with the other domain the same. Alternatively, the shortlister component 650 may leave the confidence score associated with the domain associated with at least one enabled skill the same while decreasing the confidence score associated with the other domain. Moreover, the shortlister component 650 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 470. When the shortlister component 650 receives the text data 710, the shorlister component 650 may determine whether profile data associated with the user and/or device 110 that originated the command includes an indication of enabled skills.

The other data 720 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 650 may use such data to determine which domain-specific trained models to run. For example, if the device 110 corresponds to a displayless type device, the shortlister component 650 may determine not to run trained models specific to domains that output video data. The shortlister component 650 may alternatively use such data to alter confidence scores of domains.

As an example, considering two domains, one that outputs audio data and another that outputs video data, the shortlister component 650 may run a first model specific to the domain that generates audio data as well as a second model specific to the domain that generates video data. Alternatively the shortlister component 650 may run a model configured to determine a score for each domain. The shortlister component 650 may determine a same confidence score for each of the domains in the first instance. The shortlister component 650 may then alter the original confidence scores based on the type of the device 110 that originated the user input corresponding to the text data 710. For example, if the device 110 is a displayless device, the shortlister component 650 may increase the confidence score associated with the domain that generates audio data while leaving the confidence score associated with the domain that generates video data the same. Alternatively, if the device 110 is a displayless device, the shortlister component 650 may leave the confidence score associated with the domain that generates audio data the same while decreasing the confidence score associated with the domain that generates video data. Moreover, if the device 110 is a displayless device, the shortlister component 650 may increase the confidence score associated with the domain that generates audio data as well as decrease the confidence score associated with the domain that generates video data.

The type of device information represented in the other data 720 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 720 may represent the smart TV of other display device, and not the displayless device that captured the spoken user input.

The other data 720 may also include data indicating the user input originating device's speed, location, or other mobility information. For example, the device may correspond to a vehicle including a display. If the vehicle is moving, the shortlister component 650 may decrease the confidence score associated with a domain that generates video data as it may be undesirable to output video content to a user while the user is driving. The device may output data to the system(s) 120 indicating when the device is moving.

The other data 720 may also include data indicating a currently invoked domain. For example, a user may speak a first (e.g., a previous) user input causing the system to invoke an music domain skill to output music to the user. As the system is outputting music to the user, the system may receive a second (e.g., the current) user input. The shortlister component 650 may use such data to alter confidence scores of domains. For example, the shortlister component 650 may run a first model specific to a first domain as well as a second model specific to a second domain. Alternatively, the shortlister component 650 may run a model configured to determine a score for each domain. The shortlister component 650 may also determine a same confidence score for each of the domains in the first instance. The shortlister component 650 may then alter the original confidence scores based on the first domain being invoked to cause the system to output content while the current user input was received. Based on the first domain being invoked, the shortlister component 650 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 715 generated by the shortlister component 650 as well as the different types of other data 720 considered by the shortlister component 650 are configurable. For example, the shortlister component 650 may update confidence scores as more other data 720 is considered. For further example, the n-best list data 715 may exclude relevant domains if thresholding is implemented. Thus, for example, the shortlister component 650 may include an indication of a domain in the n-best list 715 unless the shortlister component 650 is one hundred percent confident that the domain may not execute the user input represented in the text data 710 (e.g., the shortlister component 650 determines a confidence score of zero for the domain).

The shortlister component 650 may send the text data 710 to recognizers 663 associated with domains represented in the n-best list data 715. Alternatively, the shortlister component 650 may send the n-best list data 715 or some other indicator of the selected subset of domains to another component (such as the orchestrator component 430) which may in turn send the text data 710 to the recognizers 663 corresponding to the domains included in the n-best list data 715 or otherwise indicated in the indicator. If the shortlister component 650 generates an n-best list representing domains without any associated confidence scores, the shortlister component 650/orchestrator component 430 may send the text data 710 to recognizers 663 associated with domains that the shortlister component 650 determines may execute the user input. If the shortlister component 650 generates an n-best list representing domains with associated confidence scores, the shortlister component 650/orchestrator component 430 may send the text data 710 to recognizers 663 associated with domains associated with confidence scores satisfying (e.g., meeting or exceeding) a threshold minimum confidence score.

A recognizer 663 may output tagged text data generated by an NER component 662 and an IC component 664, as described herein above. The NLU component 460 may compile the output tagged text data of the recognizers 663 into a single cross-domain n-best list 740 and may send the cross-domain n-best list 740 to a pruning component 750. Each entry of tagged text (e.g., each NLU hypothesis) represented in the cross-domain n-best list data 740 may be associated with a respective score indicating a likelihood that the NLU hypothesis corresponds to the domain associated with the recognizer 663 from which the NLU hypothesis was output. For example, the cross-domain n-best list data 740 may be represented as (with each line corresponding to a different NLU hypothesis):

[0.95] Intent: <PlayMusic>ArtistName: Lady Gaga SongName: Poker Face

[0.70] Intent: <PlayVideo>ArtistName: Lady Gaga VideoName: Poker Face

[0.01] Intent: <PlayMusic>ArtistName: Lady Gaga AlbumName: Poker Face

[0.01] Intent: <PlayMusic>SongName: Pokerface

The pruning component 750 may sort the NLU hypotheses represented in the cross-domain n-best list data 740 according to their respective scores. The pruning component 750 may perform score thresholding with respect to the cross-domain NLU hypotheses. For example, the pruning component 750 may select NLU hypotheses associated with scores satisfying (e.g., meeting and/or exceeding) a threshold score. The pruning component 750 may also or alternatively perform number of NLU hypothesis thresholding. For example, the pruning component 750 may select the top scoring NLU hypothesis(es). The pruning component 750 may output a portion of the NLU hypotheses input thereto. The purpose of the pruning component 750 is to create a reduced list of NLU hypotheses so that downstream, more resource intensive, processes may only operate on the NLU hypotheses that most likely represent the user's intent.

The NLU component 460 may include a light slot filler component 752. The light slot filler component 752 can take text from slots represented in the NLU hypotheses output by the pruning component 750 and alter them to make the text more easily processed by downstream components. The light slot filler component 752 may perform low latency operations that do not involve heavy operations such as reference to a knowledge base. The purpose of the light slot filler component 752 is to replace words with other words or values that may be more easily understood by downstream components. For example, if a NLU hypothesis includes the word "tomorrow," the light slot filler component 752 may replace the word "tomorrow" with an actual date for purposes of downstream processing. Similarly, the light slot filler component 752 may replace the word "CD" with "album" or the words "compact disc." The replaced words are then included in the cross-domain n-best list data 760.

The cross-domain n-best list data 760 may be input to an entity resolution component 770. The entity resolution component 770 can apply rules or other instructions to standardize labels or tokens from previous stages into an intent/slot representation. The precise transformation may depend on the domain. For example, for a travel domain, the entity resolution component 770 may transform text corresponding to "Boston airport" to the standard BOS three-letter code referring to the airport. The entity resolution component 770 can refer to a knowledge base that is used to specifically identify the precise entity referred to in each slot of each NLU hypothesis represented in the cross-domain n-best list data 760. Specific intent/slot combinations may also be tied to a particular source, which may then be used to resolve the text. In the example "play songs by the stones," the entity resolution component 770 may reference a personal music catalog, Amazon Music account, a user profile, or the like. The entity resolution component 770 may output an altered n-best list that is based on the cross-domain n-best list 760 but that includes more detailed information (e.g., entity IDs) about the specific entities mentioned in the slots and/or more detailed slot data that can eventually be used by a skill. The NLU component 460 may include multiple entity resolution components 770 and each entity resolution component 770 may be specific to one or more domains.

The NLU component 460 may include a reranker 790. The reranker 790 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 770.

The reranker 790 may apply re-scoring, biasing, or other techniques. The reranker 790 may consider not only the data output by the entity resolution component 770, but may also consider other data 791. The other data 791 may include a variety of information. For example, the other data 791 may include skill rating or popularity data. For example, if one skill has a high rating, the reranker 790 may increase the score of a NLU hypothesis that may be processed by the skill. The other data 791 may also include information about skills that have been enabled by the user that originated the user input. For example, the reranker 790 may assign higher scores to NLU hypothesis that may be processed by enabled skills than NLU hypothesis that may be processed by non-enabled skills. The other data 791 may also include data indicating user usage history, such as if the user that originated the user input regularly uses a particular skill or does so at particular times of day. The other data 791 may additionally include data indicating date, time, location, weather, type of device 110, user identifier, context, as well as other information. For example, the reranker 790 may consider when any particular skill is currently active (e.g., music being played, a game being played, etc.).

As illustrated and described, the entity resolution component 770 is implemented prior to the reranker 790. The entity resolution component 770 may alternatively be implemented after the reranker 790. Implementing the entity resolution component 770 after the reranker 790 limits the NLU hypotheses processed by the entity resolution component 770 to only those hypotheses that successfully pass through the reranker 790.

The reranker 790 may be a global reranker (e.g., one that is not specific to any particular domain). Alternatively, the NLU component 460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 460 may perform NLU processing described above with respect to domains associated with skills wholly implemented as part of the system(s) 120 (e.g., designated 490 in FIG. 4). The NLU component 460 may separately perform NLU processing described above with respect to domains associated with skills that are at least partially implemented as part of the skill system(s) 125. In an example, the shortlister component 650 may only process with respect to these latter domains. Results of these two NLU processing paths may be merged into NLU output data 785, which may be sent to a post-NLU ranker 465, which may be implemented by the system(s) 120.

The post-NLU ranker 465 may include a statistical component that produces a ranked list of intent/skill pairs with associated confidence scores. Each confidence score may indicate an adequacy of the skill's execution of the intent with respect to NLU results data associated with the skill. The post-NLU ranker 465 may operate one or more trained models configured to process the NLU results data 785, skill result data 730, and the other data 720 in order to output ranked output data 725. The ranked output data 725 may include an n-best list where the NLU hypotheses in the NLU results data 785 are reordered such that the n-best list in the ranked output data 725 represents a prioritized list of skills to respond to a user input as determined by the post-NLU ranker 465. The ranked output data 725 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 465 enables the system to better determine the best skill to execute the user input. For example, first and second NLU hypotheses in the NLU results data 785 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 465 (or other scheduling component such as orchestrator component 430) may solicit the first skill and the second skill to provide potential result data 730 based on the first NLU hypothesis and the second NLU hypothesis, respectively. For example, the post-NLU ranker 465 may send the first NLU hypothesis to the first skill 290a along with a request for the first skill 290a to at least partially execute with respect to the first NLU hypothesis. The post-NLU ranker 465 may also send the second NLU hypothesis to the second skill 290b along with a request for the second skill 290b to at least partially execute with respect to the second NLU hypothesis. The post-NLU ranker 465 receives, from the first skill 290a, first result data 730a generated from the first skill 490a's execution with respect to the first NLU hypothesis. The post-NLU ranker 465 also receives, from the second skill 290b, second results data 730b generated from the second skill 490b's execution with respect to the second NLU hypothesis.

The result data 730 may include various portions. For example, the result data 730 may include content (e.g., audio data, text data, and/or video data) to be output to a user. The result data 730 may also include a unique identifier used by the system(s) 120 and/or the skill system(s) 125 to locate the data to be output to a user. The result data 730 may also include an instruction. For example, if the user input corresponds to "turn on the light," the result data 730 may include an instruction causing the system to turn on a light associated with a profile of the device (110a/110b) and/or user.

The post-NLU ranker 465 may consider the first result data 730a and the second result data 730b to alter the first confidence score and the second confidence score of the first NLU hypothesis and the second NLU hypothesis, respectively. That is, the post-NLU ranker 465 may generate a third confidence score based on the first result data 730a and the first confidence score. The third confidence score may correspond to how likely the post-NLU ranker 465 determines the first skill will correctly respond to the user input. The post-NLU ranker 465 may also generate a fourth confidence score based on the second result data 730b and the second confidence score. One skilled in the art will appreciate that a first difference between the third confidence score and the fourth confidence score may be greater than a second difference between the first confidence score and the second confidence score. The post-NLU ranker 465 may also consider the other data 720 to generate the third confidence score and the fourth confidence score. While it has been described that the post-NLU ranker 465 may alter the confidence scores associated with first and second NLU hypotheses, one skilled in the art will appreciate that the post-NLU ranker 465 may alter the confidence scores of more than two NLU hypotheses. The post-NLU ranker 465 may select the result data 730 associated with the skill 490 with the highest altered confidence score to be the data output in response to the current user input. The post-NLU ranker 465 may also consider the text data 710 to alter the NLU hypotheses confidence scores.

The orchestrator component 430 may, prior to sending the NLU results data 785 to the post-NLU ranker 465, associate intents in the NLU hypotheses with skills 490. For example, if a NLU hypothesis includes a <PlayMusic>intent, the orchestrator component 430 may associate the NLU hypothesis with one or more skills 490 that can execute the <PlayMusic>intent. Thus, the orchestrator component 430 may send the NLU results data 785, including NLU hypotheses paired with skills 490, to the post-NLU ranker 465. In response to text data 710 corresponding to "what should I do for dinner today," the orchestrator component 430 may generates pairs of skills 490 with associated NLU hypotheses corresponding to:

Skill 1/NLU hypothesis including <Help>intent
Skill 2/NLU hypothesis including <Order>intent
Skill 3/NLU hypothesis including <DishType>intent The post-NLU ranker 465 queries each skill 490, paired with a NLU hypothesis in the NLU output data 785, to provide result data 730 based on the NLU hypothesis with which it is associated. That is, with respect to each skill, the post-NLU ranker 465 colloquially asks the each skill "if given this NLU hypothesis, what would you do with it." According to the above example, the post-NLU ranker 465 may send skills 490 the following data:

Skill 1: First NLU hypothesis including <Help>intent indicator Skill 2: Second NLU hypothesis including <Order>intent indicator Skill 3: Third NLU hypothesis including <DishType>intent indicator The post-NLU ranker 465 may query each of the skills 490 in parallel or substantially in parallel.

A skill 490 may provide the post-NLU ranker 465 with various data and indications in response to the post-NLU ranker 465 soliciting the skill 490 for result data 730. A skill 490 may simply provide the post-NLU ranker 465 with an indication of whether or not the skill can execute with respect to the NLU hypothesis it received. A skill 490 may also or alternatively provide the post-NLU ranker 465 with output data generated based on the NLU hypothesis it received. In some situations, a skill 490 may need further information in addition to what is represented in the received NLU hypothesis to provide output data responsive to the user input. In these situations, the skill 490 may provide the post-NLU ranker 465 with result data 730 indicating slots of a framework that the skill 490 further needs filled or entities that the skill 490 further needs resolved prior to the skill 490 being able to provided result data 730 responsive to the user input. The skill 490 may also provide the post-NLU ranker 465 with an instruction and/or computer-generated speech indicating how the skill 490 recommends the system solicit further information needed by the skill 490. The skill 490 may further provide the post-NLU ranker 465 with an indication of whether the skill 490 will have all needed information after the user provides additional information a single time, or whether the skill 490 will need the user to provide various kinds of additional information prior to the skill 490 having all needed information. According to the above example, skills 490 may provide the post-NLU ranker 465 with the following:

Skill 1: indication representing the skill can execute with respect to a NLU hypothesis including the <Help>intent indicator Skill 2: indication representing the skill needs to the system to obtain further information Skill 3: indication representing the skill can provide numerous results in response to the third NLU hypothesis including the <DishType>intent indicator Result data 730 includes an indication provided by a skill 490 indicating whether or not the skill 490 can execute with respect to a NLU hypothesis; data generated by a skill 490 based on a NLU hypothesis; as well as an indication provided by a skill 490 indicating the skill 490 needs further information in addition to what is represented in the received NLU hypothesis.

The post-NLU ranker 465 uses the result data 730 provided by the skills 490 to alter the NLU processing confidence scores generated by the reranker 790. That is, the post-NLU ranker 465 uses the result data 730 provided by the queried skills 490 to create larger differences between the NLU processing confidence scores generated by the reranker 790. Without the post-NLU ranker 465, the system may not be confident enough to determine an output in response to a user input, for example when the NLU hypotheses associated with multiple skills are too close for the system to confidently determine a single skill 490 to invoke to respond to the user input. For example, if the system does not implement the post-NLU ranker 465, the system may not be able to determine whether to obtain output data from a general reference information skill or a medical information skill in response to a user input corresponding to "what is acne."

The post-NLU ranker 465 may prefer skills 490 that provide result data 730 responsive to NLU hypotheses over skills 490 that provide result data 730 corresponding to an indication that further information is needed, as well as skills 490 that provide result data 730 indicating they can provide multiple responses to received NLU hypotheses. For example, the post-NLU ranker 465 may generate a first score for a first skill 490a that is greater than the first skill's NLU confidence score based on the first skill 490a providing result data 430a including a response to a NLU hypothesis. For further example, the post-NLU ranker 465 may generate a second score for a second skill 490b that is less than the second skill's NLU confidence score based on the second skill 490b providing result data 730b indicating further information is needed for the second skill 490b to provide a response to a NLU hypothesis. Yet further, for example, the post-NLU ranker 465 may generate a third score for a third skill 490c that is less than the third skill's NLU confidence score based on the third skill 490c providing result data 730c indicating the third skill 490c can provide multiple responses to a NLU hypothesis.

The post-NLU ranker 465 may consider other data 720 in determining scores. The other data 720 may include rankings associated with the queried skills 490. A ranking may be a system ranking or a user-specific ranking. A ranking may indicate a veracity of a skill from the perspective of one or more users of the system. For example, the post-NLU ranker 465 may generate a first score for a first skill 490a that is greater than the first skill's NLU processing confidence score based on the first skill 490a being associated with a high ranking. For further example, the post-NLU ranker 465 may generate a second score for a second skill 490b that is less than the second skill's NLU processing confidence score based on the second skill 490b being associated with a low ranking.

The other data 720 may include information indicating whether or not the user that originated the user input has enabled one or more of the queried skills 490. For example, the post-NLU ranker 465 may generate a first score for a first skill 490a that is greater than the first skill's NLU processing confidence score based on the first skill 490a being enabled by the user that originated the user input. For further example, the post-NLU ranker 465 may generate a second score for a second skill 490b that is less than the second skill's NLU processing confidence score based on the second skill 490b not being enabled by the user that originated the user input. When the post-NLU ranker 465 receives the NLU results data 785, the post-NLU ranker 465 may determine whether profile data, associated with the user and/or device that originated the user input, includes indications of enabled skills.

The other data 720 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 465 may increase the NLU processing confidence score associated with a first skill configured to output visual data and/or decrease the NLU processing confidence score associated with a second skill configured to output audio data.

The other data 720 may include information indicating the veracity of the result data 730 provided by a skill 490. For example, if a user says "tell me a recipe for pasta sauce," a first skill 490a may provide the post-NLU ranker 465 with first result data 730a corresponding to a first recipe associated with a five star rating and a second skill 490b may provide the post-NLU ranker 465 with second result data 730b corresponding to a second recipe associated with a one star rating. In this situation, the post-NLU ranker 465 may increase the NLU processing confidence score associated with the first skill 490a based on the first skill 490a providing the first result data 730a associated with the five star rating and/or decrease the NLU processing confidence score associated with the second skill 490b based on the second skill 490b providing the second result data 730b associated with the one star rating.

The other data 720 may include information indicating the type of device that originated the user input. For example, the device may correspond to a "hotel room" type if the device is located in a hotel room. If a user inputs a command corresponding to "order me food" to the device located in the hotel room, the post-NLU ranker 465 may increase the NLU processing confidence score associated with a first skill 490a corresponding to a room service skill associated with the hotel and/or decrease the NLU processing confidence score associated with a second skill 490b corresponding to a food skill not associated with the hotel.

The other data 720 may include information indicating a location of the device and/or user that originated the user input. The system may be configured with skills 490 that may only operate with respect to certain geographic locations. For example, a user may provide a user input corresponding to "when is the next train to Portland." A first skill 490a may operate with respect to trains that arrive at, depart from, and pass through Portland, Oregon. A second skill 490b may operate with respect to trains that arrive at, depart from, and pass through Portland, Maine. If the device and/or user that originated the user input is located in Seattle, Washington, the post-NLU ranker 465 may increase the NLU processing confidence score associated with the first skill 490a and/or decrease the NLU processing confidence score associated with the second skill 490b. Likewise, if the device and/or user that originated the user input is located in Boston, Massachusetts, the post-NLU ranker 465 may increase the NLU processing confidence score associated with the second skill 490b and/or decrease the NLU processing confidence score associated with the first skill 490a.

The other data 720 may include information indicating a time of day. The system may be configured with skills 490 that operate with respect to certain times of day. For example, a user may provide a user input corresponding to "order me food." A first skill 490a may generate first result data 730a corresponding to breakfast. A second skill 490b may generate second result data 730b corresponding to dinner. If the system(s) 120 receives the user input in the morning, the post-NLU ranker 465 may increase the NLU processing confidence score associated with the first skill 490a and/or decrease the NLU processing score associated with the second skill 490b. If the system(s) 120 receives the user input in the afternoon or evening, the post-NLU ranker 465 may increase the NLU processing confidence score associated with the second skill 490b and/or decrease the NLU processing confidence score associated with the first skill 490a.

The other data 720 may include information indicating user preferences. The system may include multiple skills 490 configured to execute in substantially the same manner. For example, a first skill 490a and a second skill 490b may both be configured to order food from respective restaurants. The system may store a user preference (e.g., in the profile storage 470) that is associated with the user that provided the user input to the system(s) 120 as well as indicates the user prefers the first skill 490a over the second skill 490b. Thus, when the user provides a user input that may be executed by both the first skill 490a and the second skill 490b, the post-NLU ranker 465 may increase the NLU processing confidence score associated with the first skill 490*a* and/or decrease the NLU processing confidence score associated with the second skill 490*b*.

The other data 420 may include information indicating system usage history associated with the user that originated the user input. For example, the system usage history may indicate the user originates user inputs that invoke a first skill 490*a* more often than the user originates user inputs that invoke a second skill 490*b*. Based on this, if the present user input may be executed by both the first skill 490*a* and the second skill 490*b*, the post-NLU ranker 465 may increase the NLU processing confidence score associated with the first skill 490*a* and/or decrease the NLU processing confidence score associated with the second skill 490*b*.

The other data 720 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 465 may increase the NLU processing confidence score associated with a first skill 490*a* that generates audio data. The post-NLU ranker 465 may also or alternatively decrease the NLU processing confidence score associated with a second skill 490*b* that generates image data or video data.

The other data 720 may include information indicating how long it took a skill 490 to provide result data 730 to the post-NLU ranker 465. When the post-NLU ranker 465 multiple skills 490 for result data 730, the skills 490 may respond to the quereies at different speeds. The post-NLU ranker 465 may implement a latency budget. For example, if the post-NLU ranker 465 determines a skill 490 responds to the post-NLU ranker 465 within a threshold amount of time from receiving a query from the post-NLU ranker 465, the post-NLU ranker 465 may increase the NLU processing confidence score associated with the skill 490. Conversely, if the post-NLU ranker 465 determines a skill 490 does not respond to the post-NLU ranker 465 within a threshold amount of time from receiving a query from the post-NLU ranker 465, the post-NLU ranker 465 may decrease the NLU processing confidence score associated with the skill 490.

It has been described that the post-NLU ranker 465 uses the other data 720 to increase and decrease NLU processing confidence scores associated with various skills 490 that the post-NLU ranker 465 has already requested result data from. Alternatively, the post-NLU ranker 465 may use the other data 720 to determine which skills 490 to request result data from. For example, the post-NLU ranker 465 may use the other data 720 to increase and/or decrease NLU processing confidence scores associated with skills 490 associated with the NLU results data 785 output by the NLU component 460. The post-NLU ranker 465 may select n-number of top scoring altered NLU processing confidence scores. The post-NLU ranker 465 may then request result data 730 from only the skills 490 associated with the selected n-number of NLU processing confidence scores.

As described, the post-NLU ranker 465 may request result data 730 from all skills 490 associated with the NLU results data 785 output by the NLU component 460. Alternatively, the system(s) 120 may prefer result data 730 from skills implemented entirely by the system(s) 120 rather than skills at least partially implemented by the skill system(s) 125. Therefore, in the first instance, the post-NLU ranker 465 may request result data 730 from only skills associated with the NLU results data 785 and entirely implemented by the system(s) 120. The post-NLU ranker 465 may only request result data 730 from skills associated with the NLU results data 785, and at least partially implemented by the skill system(s) 125, if none of the skills, wholly implemented by the system(s) 120, provide the post-NLU ranker 465 with result data 730 indicating either data response to the NLU results data 785, an indication that the skill can execute the user input, or an indication that further information is needed.

As indicated above, the post-NLU ranker 465 may request result data 730 from multiple skills 490. If one of the skills 490 provides result data 730 indicating a response to a NLU hypothesis and the other skills provide result data 730 indicating either they cannot execute or they need further information, the post-NLU ranker 465 may select the result data 730 including the response to the NLU hypothesis as the data to be output to the user. If more than one of the skills 490 provides result data 730 indicating responses to NLU hypotheses, the post-NLU ranker 465 may consider the other data 720 to generate altered NLU processing confidence scores, and select the result data 730 of the skill associated with the greatest score as the data to be output to the user.

A system that does not implement the post-NLU ranker 465 may select the highest scored NLU hypothesis in the NLU results data 785. The system may send the NLU hypothesis to a skill 490 associated therewith along with a request for output data. In some situations, the skill 490 may not be able to provide the system with output data. This results in the system indicating to the user that the user input could not be processed even though another skill associated with lower ranked NLU hypothesis could have provided output data responsive to the user input.

The post-NLU ranker 465 reduces instances of the aforementioned situation. As described, the post-NLU ranker 465 queries multiple skills associated with the NLU results data 785 to provide result data 730 to the post-NLU ranker 465 prior to the post-NLU ranker 465 ultimately determining the skill 490 to be invoked to respond to the user input. Some of the skills 490 may provide result data 730 indicating responses to NLU hypotheses while other skills 490 may providing result data 730 indicating the skills cannot provide responsive data. Whereas a system not implementing the post-NLU ranker 465 may select one of the skills 490 that could not provide a response, the post-NLU ranker 465 only selects a skill 490 that provides the post-NLU ranker 465 with result data corresponding to a response, indicating further information is needed, or indicating multiple responses can be generated.

The post-NLU ranker 465 may select result data 730, associated with the skill 490 associated with the highest score, for output to the user. Alternatively, the post-NLU ranker 465 may output ranked output data 725 indicating skills 490 and their respective post-NLU ranker rankings. Since the post-NLU ranker 465 receives result data 730, potentially corresponding to a response to the user input, from the skills 490 prior to post-NLU ranker 465 selecting one of the skills or outputting the ranked output data 725, little to no latency occurs from the time skills provide result data 730 and the time the system outputs responds to the user.

If the post-NLU ranker 465 selects result audio data to be output to a user and the system determines content should be output audibly, the post-NLU ranker 465 (or another component of the system(s) 120) may cause the device 110*a* and/or the device 110b to output audio corresponding to the result audio data. If the post-NLU ranker 465 selects result text data to output to a user and the system determines content should be output visually, the post-NLU ranker 465 (or another component of the system(s) 120) may cause the device 110b to display text corresponding to the result text data. If the post-NLU ranker 465 selects result audio data to output to a user and the system determines content should be output visually, the post-NLU ranker 465 (or another component of the system(s) 120) may send the result audio data to the ASR component 450. The ASR component 450 may generate output text data corresponding to the result audio data. The system(s) 120 may then cause the device 110b to display text corresponding to the output text data. If the post-NLU ranker 465 selects result text data to output to a user and the system determines content should be output audibly, the post-NLU ranker 465 (or another component of the system(s) 120) may send the result text data to the TTS component 480. The TTS component 480 may generate output audio data (corresponding to computer-generated speech) based on the result text data. The system(s) 120 may then cause the device 110a and/or the device 110b to output audio corresponding to the output audio data.

As described, a skill 490 may provide result data 730 either indicating a response to the user input, indicating more information is needed for the skill 490 to provide a response to the user input, or indicating the skill 490 cannot provide a response to the user input. If the skill 490 associated with the highest post-NLU ranker score provides the post-NLU ranker 465 with result data 730 indicating a response to the user input, the post-NLU ranker 465 (or another component of the system(s) 120, such as the orchestrator component 430) may simply cause content corresponding to the result data 730 to be output to the user. For example, the post-NLU ranker 465 may send the result data 730 to the orchestrator component 430. The orchestrator component 430 may cause the result data 430 to be sent to the device (110a/110b), which may output audio and/or display text corresponding to the result data 430. The orchestrator component 430 may send the result data 730 to the ASR component 450 to generate output text data and/or may send the result data 730 to the TTS component 480 to generate output audio data, depending on the situation.

The skill 490 associated with the highest post-NLU ranker score may provide the post-NLU ranker 465 with result data 730 indicating more information is needed as well as instruction data. The instruction data may indicate how the skill 490 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 465 may simply cause the received instruction data be output by the device (110a/110b). Alternatively, the instruction data may be in a format that is not capable of being output by the device (110a/110b). When this occurs, the post-NLU ranker 465 may cause the ASR component 450 or the TTS component 480 to process the instruction data, depending on the situation, to generate instruction data that may be output by the device (110a/110b). Once the user provides the system with all further information needed by the skill 490, the skill 490 may provide the system with result data 730 indicating a response to the user input, which may be output by the system as detailed above.

The system may include "informational" skills 490 that simply provide the system with information, which the system outputs to the user. The system may also include "transactional" skills 490 that require a system instruction to execute the user input. Transactional skills 490 include ride sharing skills, flight booking skills, etc. A transactional skill 490 may simply provide the post-NLU ranker 465 with result data 730 indicating the transactional skill 490 can execute the user input. The post-NLU ranker 465 may then cause the system to solicit the user for an indication that the system is permitted to cause the transactional skill 490 to execute the user input. The user-provided indication may be an audible indication or a tactile indication (e.g., activation of a virtual button or input of text via a virtual keyboard). In response to receiving the user-provided indication, the system may provide the transactional skill 490 with data corresponding to the indication. In response, the transactional skill 490 may execute the command (e.g., book a flight, book a train ticket, etc.). Thus, while the system may not further engage an informational skill 490 after the informational skill 490 provides the post-NLU ranker 465 with result data 730, the system may further engage a transactional skill 490 after the transactional skill 490 provides the post-NLU ranker 465 with result data 730 indicating the transactional skill 490 may execute the user input.

In some instances, the post-NLU ranker 465 may generate respective scores for first and second skills that are too close (e.g., are not different by at least a threshold difference) for the post-NLU ranker 465 to make a confident determination regarding which skill should execute the user input. When this occurs, the system may request the user indicate which skill the user prefers to execute the user input. The system may output TTS-generated speech to the user to solicit which skill the user wants to execute the user input.

Figure 8:
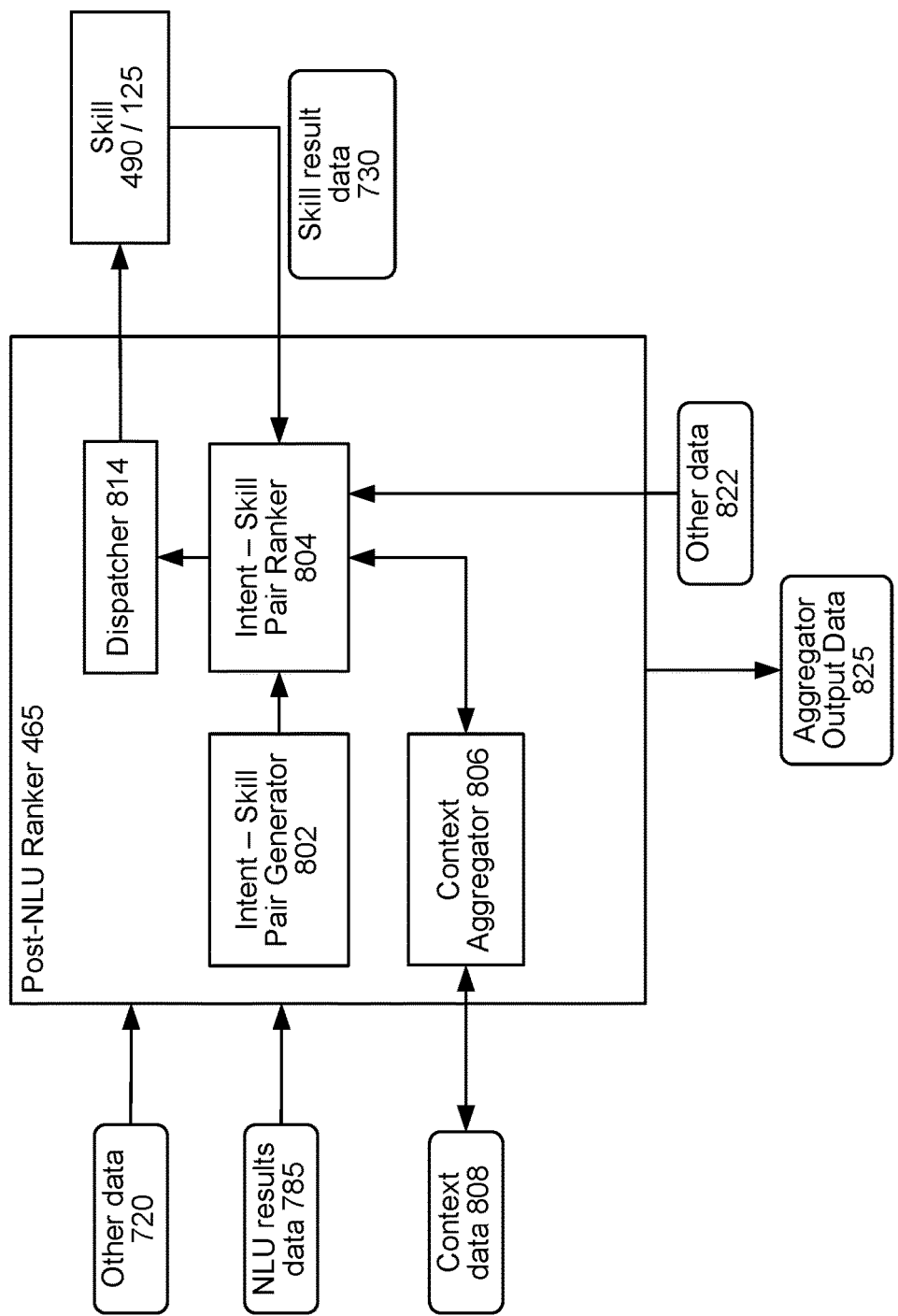
FIG. 8 is a conceptual diagram illustrating how a post-NLU ranker may process according to embodiments of the present disclosure.

FIG. 8 illustrates other configurations and operations of the post-NLU ranker 465. When the post-NLU ranker 465 receives NLU results data 785, the NLU results data 785 may be sent to an intent-skill pair generator 802. The intent-skill pair generator 802 may include information about what skills are capable of handling what intents. Such information may be context agnostic, and may thus indicate what skills are capable of handling what intents generally, without regard to the context associated with the user input. The intent-skill pair generator 802 thus receives the NLU results data 785 and identifies what particular candidate skills may handle the intent for NLU hypothesis. For example, if a NLU hypothesis includes a particular intent, the intent-skill pair generator 802 identifies each skill that may execute with respect to the intent. For further example, if the NLU results data 785 include multiple NLU hypotheses including multiple intents, the intent-skill pair generator 802 associates each different NLU hypothesis with each skill that may execute with respect to the NLU hypothesis. As illustrated, the intent-skill pair generator 802 may be implemented at part of the post-NLU ranker 465. However, one skill in the art will appreciate that the intent-skill pair generator 802 may be implemented as part of the NLU component 460 or in another component without departing from the present disclosure. In such a case, the NLU results data 785 may include intent-skill pairs.

The post-NLU ranker 465 may also include an intent-skill pair ranker 804. The intent-skill pair ranker 804 ranks the intent-skill pairs generated by the intent-skill pair generator 802 based on, for example, the number of filled slots of a NLU hypothesis, an NLU confidence score associated with a NLU hypothesis, context information output by a context aggregator 806, and/or other data.

The post-NLU ranker 465 may include the context aggregator 806. The context aggregator 806 receives context data 808 from various contextual sources. The context data 808 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 806 may aggregate the context data 808 and put the context data 808 in a form that can be processed by the intent-skill pair ranker 804. Context data 808 may include data obtained from the device 110 or from other services connected to the system(s) 120.

The context data 808 may include skill availability data. Such information may indicate what skills are available and authorized to process the user input. For example, if the user has only enabled certain skills, the enabled skills may be noted in the skill availability data.

The context data 808 may also include dialog data. A "dialog" or "dialog session" as used herein may refer to data transmissions (such as relating to multiple user inputs and system(s) 120 outputs) between the system(s) 120 and a local device (e.g., the device 110) that all relate to a single originating user input. Thus, the data transmissions of a dialog session may share a dialog identifier or other unique identifier that may be used by the orchestrator component 430, skill(s) 490, skill system(s) 125, etc. to track information across the dialog session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialog session related to the originating user input "play jeopardy." In some examples, a dialog-initiating user input may start with a wakeword and end with a command, such as "Alexa, play jeopardy," where "Alexa" is the wakeword and "play jeopardy" is the command. Subsequent user inputs of the same dialog session may or may not start with speaking of a wakeword. Each user input of a dialog may be associated with a unique user input identifer such that multiple user input identifiers may be associated with a single dialog session identifier.

Dialog data may include interactive focus information, (e.g., representing which skill was most recently invoked to execute a previous user input for the user and/or device 110 associated with the present user input). Dialog data may also include content focus information (e.g., representing a skill that is streaming data to the device 110 when the data corresponding to the current user input is received by the system(s) 120). The context data 808 may be one portion of the data used by the intent-skill pair ranker 804 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 808 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 808 (and/or other data 822) may include a metadata flag/indicator that represents whether the particular skill being executed is one that can handle a go-back (or other navigational) request.

The context data 808 may also include user profile data. The user profile data may represent preferences and/or characteristics of the user that originated the current user input. Such data may be received from the profile storage 470.

The context data 808 may also include location data. The location data may represent a location of the device 110 from which the user input was received.

The context data 808 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 808 may also include data regarding whether one or more skills are "in focus." A skill may be in interactive focus, meaning the skill was the most recent skill that executed a user input for a user or device associated with a present user input and/or the skill may be involved with an open dialog (e.g., series of user inputs and responses) with a user device. Interactive focus attempts to continue a conversation between a user and the system and/or a skill for purposes of processing the dialog. However, there may be instances where a user inputs a command that may be handled by a skill that is currently in interactive focus, but which the user does not intend to be executed by such skill. The system may process the context data 808 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 808 may also include other context data not explicitly recited herein.

The intent-skill pair ranker 804 may operate one or more trained models that are configured to process the NLU results data 785, skill result data 730, and other data 822 in order to determine a single best skill for executing the current user input from the available pairs output by the intent-skill pair generator 802. The intent-skill pair ranker 804 may send queries to the skills and request a first skill and a second skill (for example the candidate skills identified by the pair generator 802), to provide potential result data indicating whether the skill can handle the intent at the particular moment and if so, what the output data for the particular skill would be (e.g., data the skill would provide to a user if the skill were selected to execute the user input) based on the NLU results data 785. For example, the intent-skill pair ranker 804 may send a first NLU hypothesis, associated with a first skill, to the first skill along with a request for the first skill to at least partially execute with respect to the first NLU hypothesis. The intent-skill pair ranker 804 may also send a second NLU hypothesis, associated with the second skill, to the second skill along with a request for the second skill to at least partially execute with respect to the second NLU hypothesis. The intent-skill pair ranker 804 receives, from the first skill, first result data 730*a* generated from the first skill's execution with respect to the first NLU hypothesis. The intent-skill pair ranker 804 also receives, from the second skill, second results data 730*b* generated from the second skill's execution with respect to the second NLU hypothesis. Based on the first results data 730*a*, a first NLU confidence score associated with the first NLU hypothesis, the second results data 730*b*, a second NLU confidence score associated with the second NLU hypothesis, and other data 822 (e.g., context data, user profile data, etc.), the intent-skill pair ranker 804 determines the best skill for executing the current user input. The intent-skill pair ranker 804 sends an indication of the best skill to a dispatcher component 814.

The dispatcher 814 may then send the selected skill the information needed to execute the user input, including an indication of the intent, the appropriate context data 808 (such as device identifier, user identifier, or the like), slot data, utterance identifier, dialog identifier, or any other information needed.

One or more models implemented by components of the orchestrator component 430, post-NLU ranker 465, shortlister 650, or other component may be trained and operated according to various machine learning techniques.

Figure 9A:
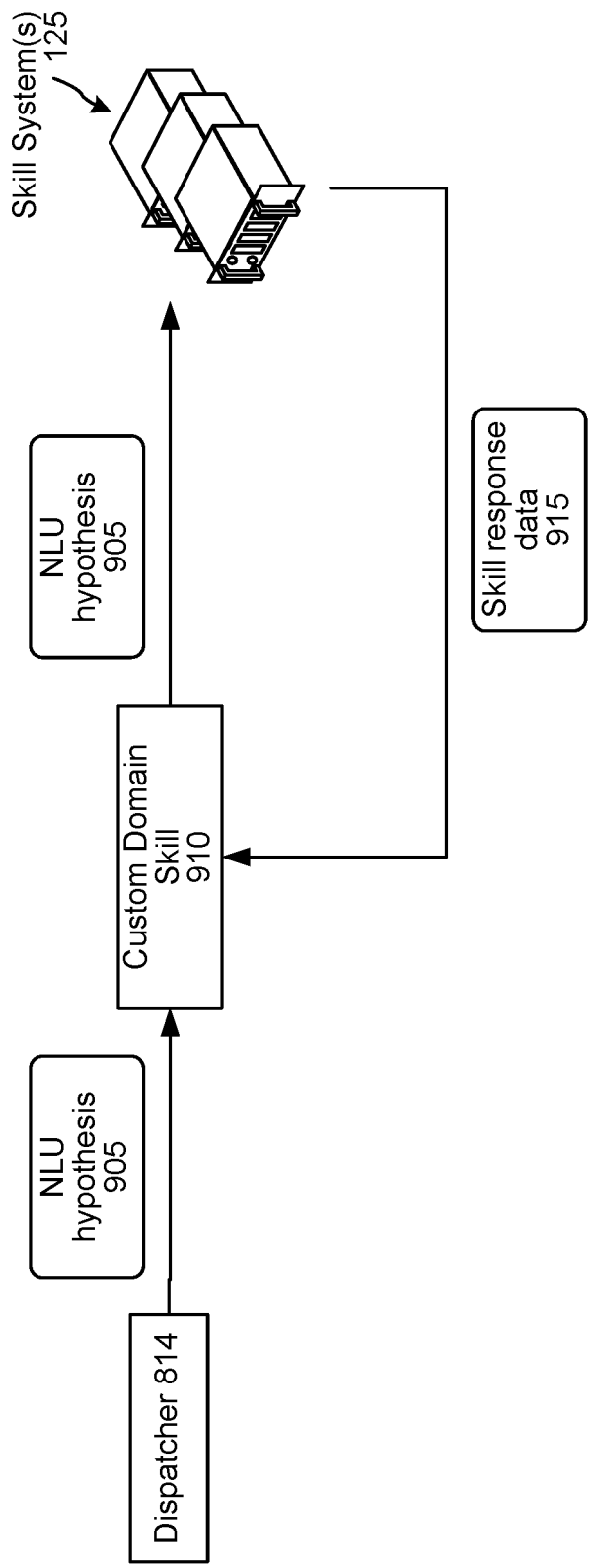
FIG. 9A is a conceptual diagram illustrating how a skill may be invoked when a top scoring NLU hypothesis corresponds to custom sample user inputs associated with the skill according to embodiments of the present disclosure.

The dispatcher 814 may output different data depending on whether the top scoring, post-NLU ranker ranked NLU hypothesis corresponds to a domain associated with custom sample user inputs or system-provided sample user inputs as described herein above. The dispatcher 814 may send the top scoring NLU hypothesis 905 (from the NLU output data 785) to a custom domain skill 910 when the top scoring NLU hypothesis 905 corresponds to custom sample user inputs of a skill (as illustrated in FIG. 9A). In an embodiment, the skill system(s) 125 may implement all skills (or portions thereof) associated with custom sample user inputs). The custom domain skill 910 may be a skill 490 particularly configured to communicate with skill systems 125 in communication with the system(s) 120. The custom domain skill 910 may send the NLU hypothesis 905 to a skill system(s) 125 implementing the skill associated with the NLU hypothesis 905. The skill may perform an action and generate data responsive to the NLU hypothesis. Skill response data 915, corresponding to the generated data or representing the action, may be sent from the skill system(s) 125 to the custom domain skill 910 (or another component of the system(s) 120, such as the orchestrator component 430). Thereafter, the skill response data 915 may be sent to the device (110*a*/110*b*) for presentment to the user.

Figure 9B:
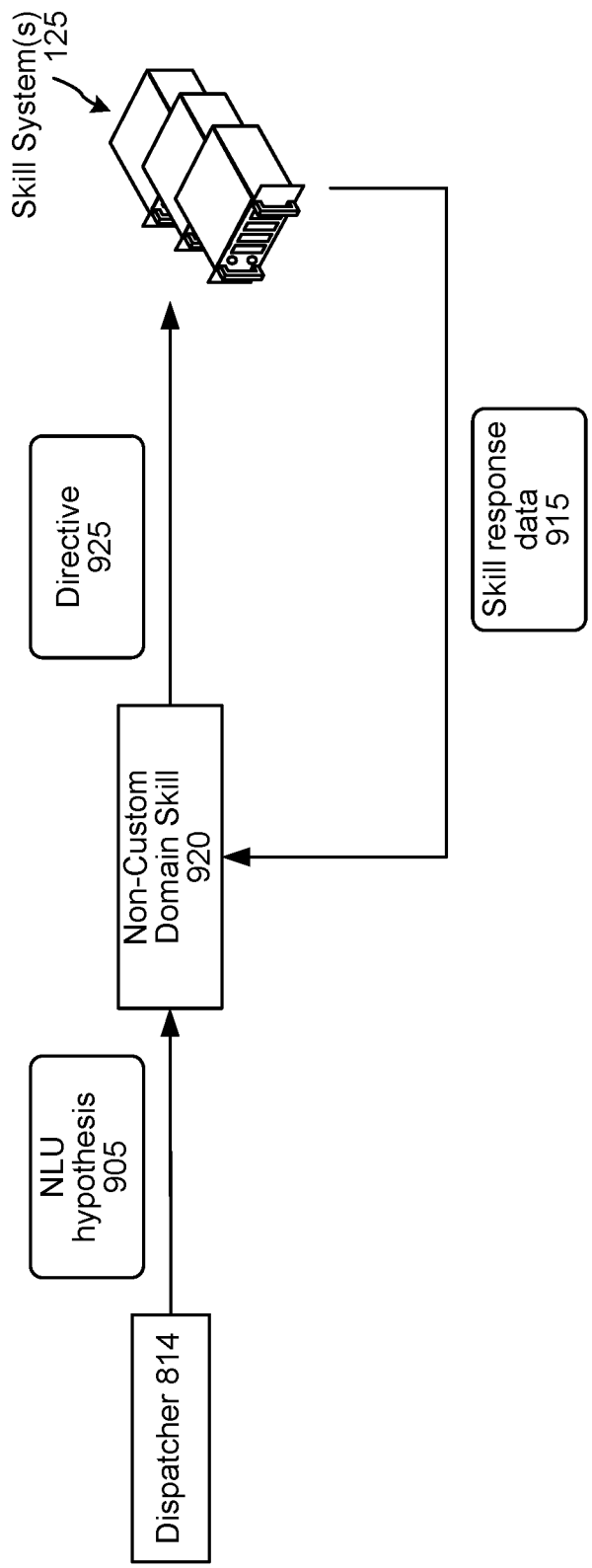
FIG. 9B is a conceptual diagram illustrating how a skill may be invoked when a top scoring NLU hypothesis corresponds to system-provided sample user inputs associated with the skill according to embodiments of the present disclosure.

The dispatcher 814 may send the top scoring NLU hypothesis 905 to a non-custom domain skill 910 when the top scoring NLU hypothesis 905 corresponds to system-provided sample user inputs of a skill (as illustrated in FIG. 9B). The non-custom domain skill 920 may be a skill 490 wholly implemented by the system(s) 120, such as a smart home skill, shopping skill, music skill, video skill, a flash briefing skill, etc. The non-custom domain skill 920 may generate a directive 925 that causes a skill system(s) 125 to perform an action responsive to the user input. The non-custom domain skill 920 may cause the directive 925 to sent to a skill system(s) 125. The skill system(s) 125 may perform an action responsive to the directive (e.g., turn on a light, turn off a light, etc.). The directive 925 may include a user identifier, device identifier, etc. such that the skill system(s) 125 may perform an action with respect to a device of the user that provided the user input (e.g., a smart light registered to the user). Skill response data 915, representing the action, may be sent from the skill system(s) 125 to the non-custom domain skill 920 (or another component of the system(s) 120, such as the orchestrator component 430). Thereafter, the skill response data 915 may be sent to the device (110*a*/110*b*) for presentment to the user.

One skilled in the art will appreciate that, in view of FIGS. 9A and 9B, a single skill (implemented by a skill system(s) 125) may be invoked in different ways depending on which underlying domain the top scoring NLU hypothesis (after processing by the post-NLU ranker 465) the NLU hypothesis corresponds to. FIGS. 9A and 9B illustrate how a skill may perform a same action intended by a user in response to the user provided differently formulated user inputs directed to the action.

Figure 10:
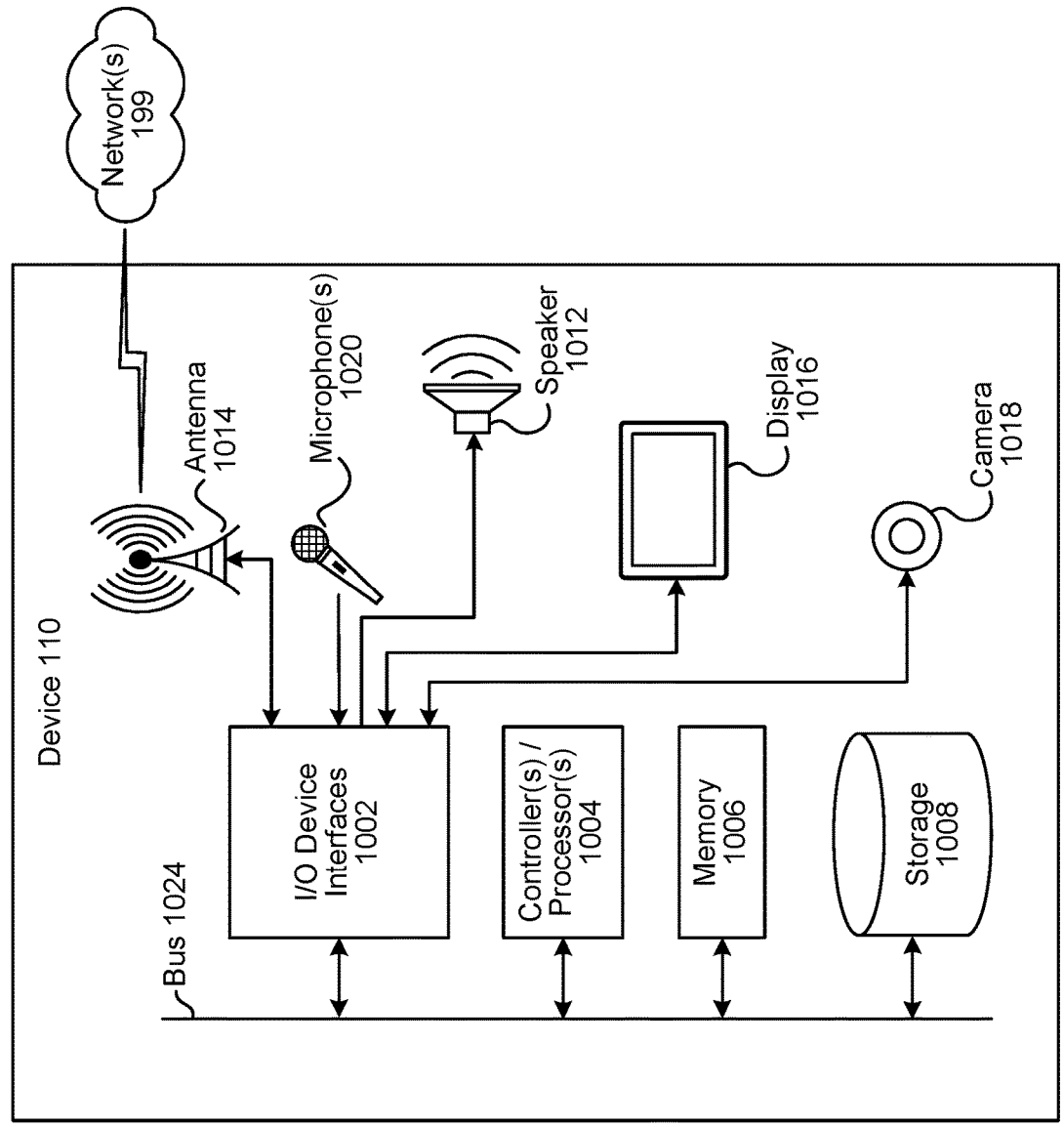
FIG. 10 is a block diagram conceptually illustrating example components of a device according to embodiments of the present disclosure.
Figure 11:
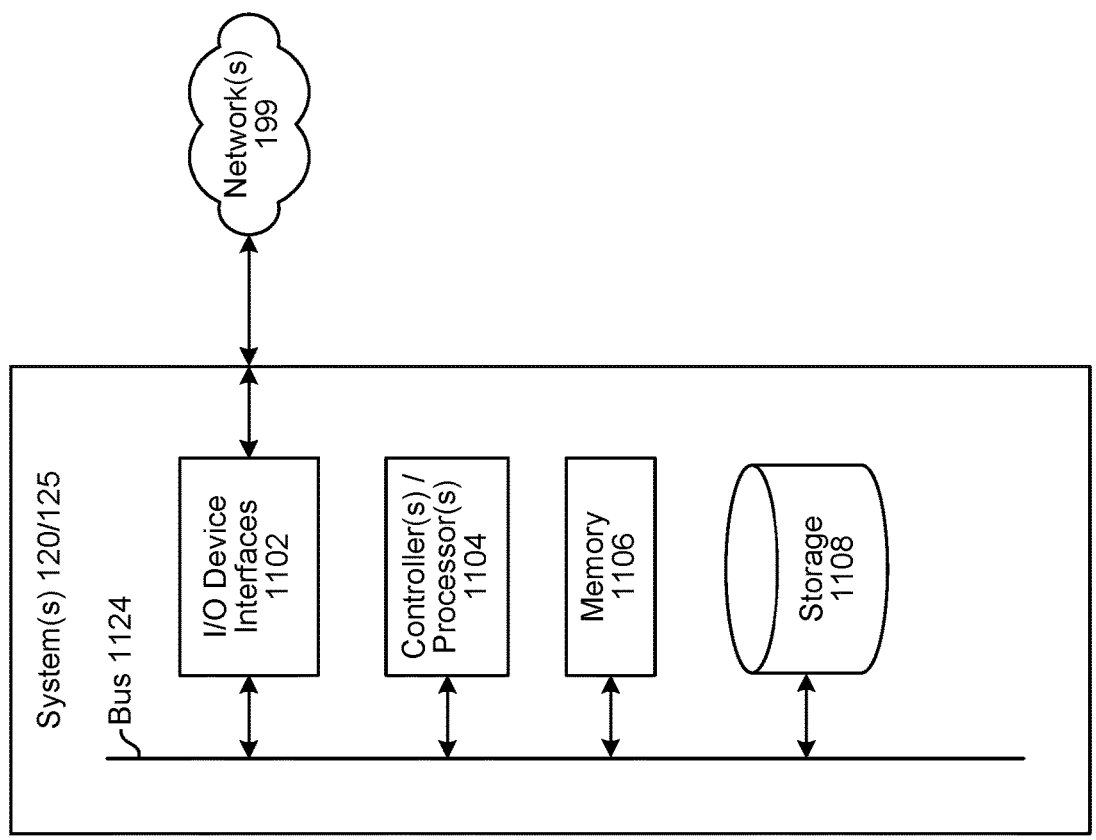
FIG. 11 is a block diagram conceptually illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (1002/1102), processor(s) (1004/1104), memory (1006/1106), and/or storage (1008/1108) of the device(s) 110 system(s) 120, or the skill system(s) 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 12:
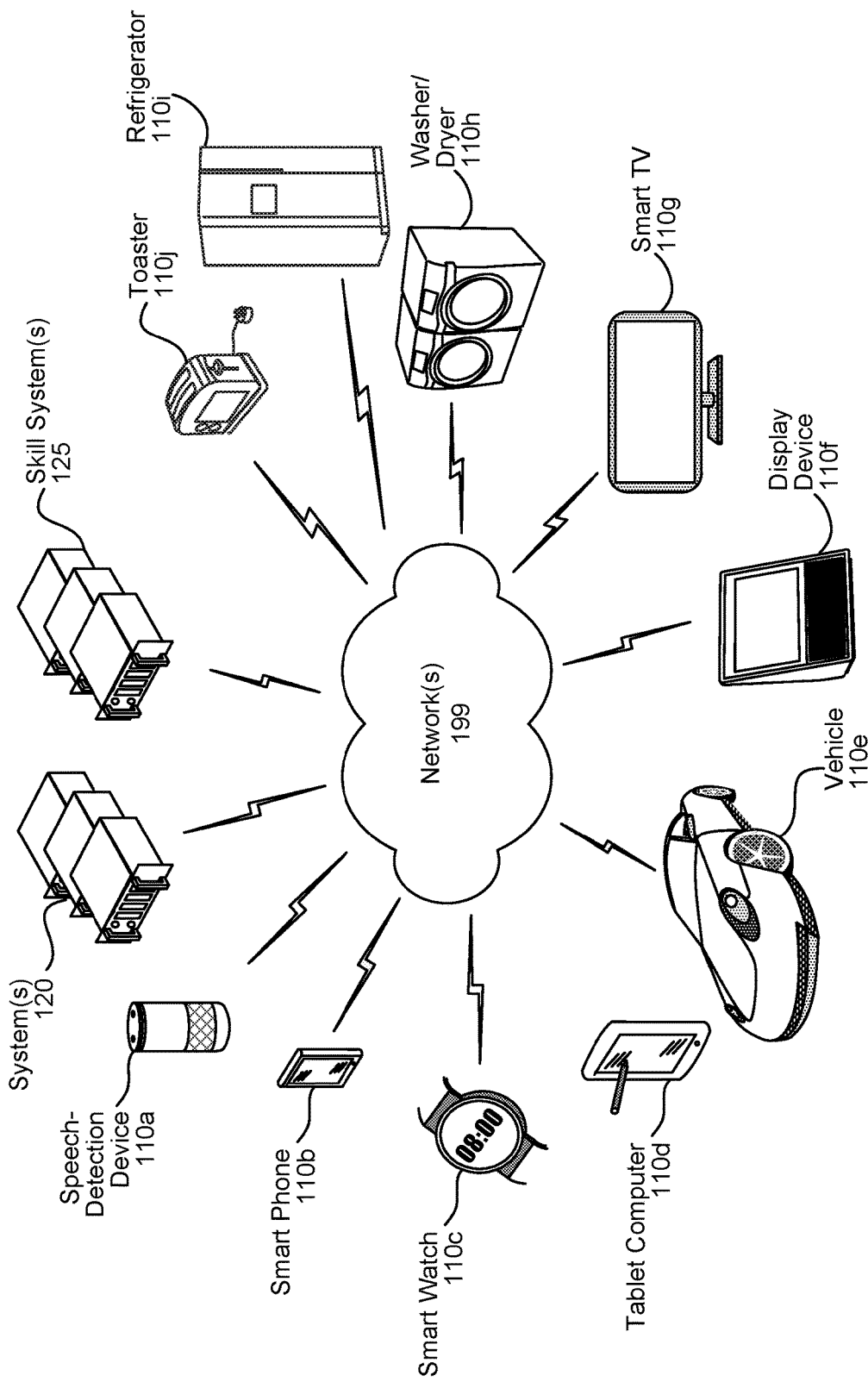
FIG. 12 illustrates an example of a computer network for use with the speech processing system.

As illustrated in FIG. 12, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, and/or a toaster 110*j* may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A system for processing natural language inputs, the system comprising:
    a first skill component configured to process with respect to a first domain and a second domain, wherein the first skill component is unable to process with respect to a third domain;
    a second skill component configured to process with respect to the third domain;
    at least one processor; and
    at least one memory comprising instructions that, when executed by the at least one processor, cause the system to:
        receive first audio data representing a first spoken user input;
        determine first automatic speech recognition (ASR) output data corresponding to the first audio data;
        determine, using the first ASR output data, a first natural language understanding (NLU) hypothesis corresponding to the first spoken user input, the first NLU hypothesis including a first intent indicator corresponding to the first domain;
        based at least in part on the first intent indicator corresponding to the first domain, send the first NLU hypothesis to the first skill component instead of the second skill component, wherein the first skill component is configured to process the first NLU hypothesis to generate first output data responsive to the first spoken user input;
        after sending the first NLU hypothesis, receive the first output data from the first skill component;
        present the first output data;
        receive second audio data representing a second spoken user input;
        determine second ASR output data corresponding to the second audio data;
        determine, using the second ASR output data, a second NLU hypothesis corresponding to the second spoken user input, the second NLU hypothesis including a second intent indicator corresponding to the second domain;
        based at least in part on the second intent indicator corresponding to the second domain, send the second NLU hypothesis to the first skill component instead of the second skill component, wherein the first skill component is configured to process the second NLU hypothesis to generate second output data responsive to the second spoken user input;
        after sending the second NLU hypothesis, receive the second output data from the first skill component; and
        present the second output data.

2. The system of claim 1, wherein the at least one memory further comprises instructions that, when executed by the at least one processor, further cause the system to:
    determine a first device that received the first spoken user input;
    determine a geographic location corresponding to the first device;
    determine the first skill component is associated with the geographic location; and
    determine the first NLU hypothesis based at least in part on determining the first skill component is associated with the geographic location.

3. The system of claim 1, wherein:
    the first domain corresponds to at least a first functionality defined by the first skill component; and
    the second domain corresponds to at least a second functionality defined by the system.

4. The system of claim 1, wherein the at least one memory further comprises instructions that, when executed by the at least one processor, further cause the system to:
    generate a first NLU model using a first sample user input associated with the first domain;
    generate a second NLU model using a second sample user input associated with the second domain;
    store first data associating the first skill component with the first NLU model; and
    store second data associating the first skill component with the second NLU model.

5. A system, comprising:
    a first skill component configured to process with respect to a first domain and a second domain, wherein the first skill component is unable to process with respect to a third domain;
    a second skill component configured to process with respect to the third domain;
    at least one processor; and
    at least one memory comprising instructions that, when executed by the at least one processor, cause the system to:

receive first data representing a first user input;
determine, using the first data, a first natural language understanding (NLU) hypothesis corresponding to the first user input, the first NLU hypothesis including a first intent indicator corresponding to the first domain;
based at least in part on the first intent indicator corresponding to the first domain, send the first NLU hypothesis to the first skill component instead of the second skill component, wherein the first skill component is configured to process the first NLU hypothesis to generate first output data responsive to the first user input;
after sending the first NLU hypothesis, receive the first output data from the first skill component;
present the first output data;
receive second data representing a second user input;
determine, using the second data, a second NLU hypothesis corresponding to the second user input, the second NLU hypothesis including a second intent indicator corresponding to the second domain;
based at least in part on the second intent indicator corresponding to the second domain, send the second NLU hypothesis to the first skill component instead of the second skill component, wherein the first skill component is configured to process the second NLU hypothesis to generate second output data responsive to the second user input;
after sending the second NLU hypothesis, receive the second output data from the first skill component; and
present the second output data.

6. The system of claim 5, wherein the at least one memory further comprises instructions that, when executed by the at least one processor, further cause the system to:
receive an indication to enable the first skill component, the first skill component being associated with a first identifier;
determine a user profile identifier associated with the first user input; and
store third data associating the first identifier with the user profile identifier, wherein storing the third data permits the first skill component to process with respect to user inputs associated with the user profile identifier.

7. The system of claim 5, wherein the at least one memory further comprises instructions that, when executed by the at least one processor, further cause the system to:
generate a first NLU model using a first sample user input associated with the first domain;
generate a second NLU model using a second sample user input associated with the second domain;
store, prior to receiving the first data, third data associating the first skill component with the first NLU model; and
store, prior to receiving the first data, fourth data associating the first skill component with the second NLU model.

8. The system of claim 5, wherein the at least one memory further comprises instructions that, when executed by the at least one processor, further cause the system to:
cause a device to display a page of a graphical user interface (GUI), the page including a representation of a first sample user input associated with the first domain and a representation of a second sample user input associated with the second domain, the first sample user input capable of being used to invoke a first function of the first skill component, the second sample user input capable of being used to invoke a second function of the first skill component.

9. The system of claim 5, wherein the at least one memory further comprises instructions that, when executed by the at least one processor, further cause the system to:
determine a first device that received the first user input;
determine a geographic location corresponding to the first device;
determine the first skill component is associated with the geographic location; and
determine the first NLU hypothesis based at least in part on determining the first skill component is associated with the geographic location.

10. The system of claim 5, wherein the at least one memory further comprises instructions that, when executed by the at least one processor, further cause the system to:
receive, from the first skill component, first potential output data;
receive, from the second skill component, second potential output data; and
send the first NLU hypothesis to the first skill component further based at least in part on the first potential output data and the second potential output data.

11. The system of claim 5, wherein the at least one memory further comprises instructions that, when executed by the at least one processor, further cause the system to:
determine the first intent indicator based at least in part on a first sample user input received from the first skill component; and
determine the second intent indicator based at least in part on a second sample user input determined using the system.

12. The system of claim 5, wherein:
the first domain corresponds to at least a first functionality defined by the first skill component; and
the second domain corresponds to at least a second functionality defined by the system.

13. A method executable by a system comprising:
a first skill component configured to process with respect to a first domain and a second domain, wherein the first skill component is unable to process with respect to a third domain; and
a second skill component configured to process with respect to the third domain,
the method comprising:
receiving first data representing a first user input;
determining, using the first data, a first natural language understanding (NLU) hypothesis corresponding to the first user input, the first NLU hypothesis including a first intent indicator corresponding to the first domain;
based at least in part on the first intent indicator corresponding to the first domain, sending the first NLU hypothesis to the first skill component instead of the second skill component, wherein the first skill component is configured to process the first NLU hypothesis to generate first output data responsive to the first user input;
after sending the first NLU hypothesis, receiving the first output data from the first skill component;
presenting the first output data;
receiving second data representing a second user input;
determining, using the second data, a second NLU hypothesis corresponding to the second user input, the second NLU hypothesis including a second intent indicator corresponding to the second domain;

based at least in part on the second intent indicator corresponding to the second domain, sending the second NLU hypothesis to the first skill component instead of the second skill component, wherein the first skill component is configured to process the second NLU hypothesis to generate second output data responsive to the second user input;

after sending the second NLU hypothesis, receiving the second output data from the first skill component; and presenting the second output data.

14. The method of claim 13, further comprising:

receiving an indication to enable the first skill component, the first skill component being associated with a first identifier;

determining a user profile identifier associated with the first user input; and storing third data associating the first identifier with the user profile identifier, wherein storing the third data permits the first skill component to be invoked with respect to user inputs associated with the user profile identifier.

15. The method of claim 13, further comprising:

generating a first NLU model using a first sample user input associated with the first domain;

generating a second NLU model using a second sample user input associated with the second domain;

storing, prior to receiving the first data, third data associating the first skill component with the first NLU model; and storing, prior to receiving the first data, fourth data associating the first skill component with the second NLU model.

16. The method of claim 13, further comprising:

causing a device to display a page of a graphical user interface (GUI), the page including a representation of a first sample user input associated with the first domain and a representation of a second sample user input associated with the second domain, the first sample user input capable of being used to invoke a first function of the first skill component, the second sample user input capable of being used to invoke a second function of the first skill component.

17. The method of claim 13, further comprising:

determining a first device that received the first user input;

determining a geographic location corresponding to the first device;

determining the first skill component is associated with the geographic location; and determining the first NLU hypothesis based at least in part on determining the first skill component is associated with the geographic location.

18. The method of claim 13, further comprising:

receiving, from the first skill component, first potential output data;

receiving, from the second skill component, second potential output data; and sending the first NLU hypothesis to the first skill component further based at least in part on the first potential output data and the second potential output data.

* * * * *